United States Patent
Drake

(10) Patent No.: US 10,372,266 B2
(45) Date of Patent: Aug. 6, 2019

(54) SYSTEMS AND METHODS OF IMPROVED WATER DETECTION ON A TOUCH-SENSITIVE DISPLAY USING DIRECTIONAL SCANNING TECHNIQUES

(71) Applicant: PARADE TECHNOLOGIES, LTD., Santa Clara, CA (US)

(72) Inventor: Victor Paul Drake, Clyde Hill, WA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 15/645,633

(22) Filed: Jul. 10, 2017

(65) Prior Publication Data

US 2018/0275825 A1 Sep. 27, 2018

Related U.S. Application Data

(60) Provisional application No. 62/476,615, filed on Mar. 24, 2017.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01)

(58) Field of Classification Search
CPC .................................................... G06F 3/0418
USPC ..................... 345/156–184; 455/566; 714/27
See application file for complete search history.

(56) References Cited

U.S. PATENT DOCUMENTS

| | | | | |
|---|---|---|---|---|
| 9,001,066 B2* | 4/2015 | Mohindra | ............. | G06F 3/0416 345/173 |
| 9,043,183 B1* | 5/2015 | Ksondzyk | ............. | G06F 3/0414 702/156 |
| 2008/0136792 A1* | 6/2008 | Peng | ..................... | G06F 3/0416 345/174 |
| 2010/0214232 A1* | 8/2010 | Chan | ....................... | G06F 3/044 345/173 |
| 2010/0321043 A1* | 12/2010 | Philipp | ................... | G06F 3/044 324/686 |
| 2011/0248954 A1* | 10/2011 | Hamada | .............. | G06F 3/03547 345/174 |
| 2012/0062499 A1* | 3/2012 | Weaver | ............... | G06F 3/03545 345/174 |

(Continued)

*Primary Examiner* — Prabodh M Dharia
(74) *Attorney, Agent, or Firm* — Morgan, Lewis & Bockius LLP

(57) ABSTRACT

An exemplary method used to improve water detection on a touch-sensitive display includes performing a plurality of scans of a touch-sensitive array using at least two different scan patterns to capture response data for at least a subset of the plurality of sensor electrodes. The method further includes determining a signal direction for each sensor electrode in the subset using the response data. The method further includes identifying touch zone(s), each comprising a group of sensor electrodes with signal directions that point towards a peak electrode response included in the group. The peak electrode response indicates a location of a candidate touch object on the touch-sensitive array. For each identified touch zone, reporting a touch object at the location of the peak electrode response upon determination that the peak electrode response for the touch zone satisfies a predefined response threshold.

20 Claims, 16 Drawing Sheets

(56) References Cited

U.S. PATENT DOCUMENTS

| | | | |
|---|---|---|---|
| 2012/0306808 A1* | 12/2012 | Huang | G06F 3/0416 345/174 |
| 2012/0319994 A1* | 12/2012 | Hatano | G06F 3/044 345/174 |
| 2012/0327004 A1* | 12/2012 | Mikladal | G06F 3/044 345/173 |
| 2013/0050107 A1* | 2/2013 | Xie | G06F 3/044 345/173 |
| 2013/0106760 A1* | 5/2013 | Pedersen | G06F 3/03545 345/174 |
| 2013/0249840 A1* | 9/2013 | Akagi | G06F 3/0418 345/173 |
| 2015/0002537 A1* | 1/2015 | Samvik | G06T 11/60 345/620 |
| 2015/0035783 A1* | 2/2015 | Brillant | G06F 3/0416 345/174 |
| 2015/0091859 A1* | 4/2015 | Rosenberg | G06F 3/044 345/174 |
| 2015/0193025 A1* | 7/2015 | Rebeschi | G06F 3/03545 345/174 |
| 2015/0253912 A1* | 9/2015 | Liu | G06F 1/16 345/174 |
| 2015/0268791 A1* | 9/2015 | Vu | G06F 3/03545 345/174 |
| 2015/0338959 A1* | 11/2015 | Xie | G06F 3/044 345/174 |
| 2015/0346903 A1* | 12/2015 | O'Connor | G09G 5/003 345/173 |
| 2016/0004380 A1* | 1/2016 | Kim | G06F 3/0416 345/174 |
| 2016/0124579 A1* | 5/2016 | Tokutake | G06F 3/0481 345/156 |
| 2016/0162073 A1* | 6/2016 | Yilmaz | G01D 5/2405 345/174 |
| 2016/0202783 A1* | 7/2016 | Bell | G06F 3/0416 345/173 |
| 2016/0202785 A1* | 7/2016 | Bell | G06F 3/0416 345/173 |
| 2016/0378208 A1* | 12/2016 | Shahparnia | G06F 3/03545 345/173 |
| 2017/0131798 A1* | 5/2017 | Geaghan | G06F 3/044 |
| 2017/0147140 A1* | 5/2017 | Kosugi | G06F 1/163 |
| 2017/0153763 A1* | 6/2017 | Vavra | G06F 3/0488 |
| 2017/0173262 A1* | 6/2017 | Veltz | A61M 5/1723 |
| 2017/0258643 A1* | 9/2017 | Xu | A61F 13/42 |
| 2018/0046321 A1* | 2/2018 | Fotopoulos | G06F 3/0416 |
| 2018/0239479 A1* | 8/2018 | Suzuki | G06F 3/0412 |

* cited by examiner

SYSTEMS AND METHODS OF IMPROVED WATER DETECTION ON A TOUCH-SENSITIVE DISPLAY USING DIRECTIONAL SCANNING TECHNIQUES

RELATED APPLICATIONS

This application claims priority to U.S. Provisional Patent Application No. 62/476,615, filed Mar. 24, 2017, which is hereby incorporated by reference in its entirety.

TECHNICAL FIELD

The disclosed implementations relate generally to touch-sensitive displays, and in particular, to water detection on touch-sensitive displays.

BACKGROUND

Computing devices, such as notebook computers, personal digital assistants, mobile communication devices, portable entertainment devices (e.g., handheld video game devices, multimedia players) may include user interface devices that facilitate interaction between a user and the computing device.

One type of user interface device that has become more common operates by way of touch sensing. A touch-sensitive system (e.g., capacitance sensing) may include a touch screen, touch-sensor pad, a touch-sensor slider, or touch-sensor buttons, and may include an array of one or more sensor elements. Touch sensing typically involves measuring, through sensor signals (e.g., increases or decreases in electrode responses), a change in capacitance associated with the sensor elements to determine a presence of an object relative to the sensor elements. However, when water contacts the touch screen, a touch position of the object may be improperly or falsely reported.

SUMMARY

Accordingly, there is a need for processes that allow the touch-sensitive system to exclude effects of water when reporting the touch position of the object. One solution to the problem is determining "signal directions" for respective sensor elements of the touch-sensitive system using different scanning patterns. For example, the touch-sensitive system may perform a plurality of scans of the touch screen (e.g., touch-sensitive array 202, FIG. 2) using different scanning patterns and capture response data during each of the plurality of scans. Using the captured response data, the touch-sensitive system may determine signal directions for respective sensor elements of the touch-sensitive system. In doing so, the touch-sensitive system may group together sensor elements according to the determined signal directions, and perhaps more importantly, exclude sensor elements according to the determined signal directions.

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to differentiate a valid touch from a false touch.

(A1) Some implementations include a method that includes, at touch-sensitive device having one or more processors and a touch-sensitive array that includes a plurality of sensor electrodes, performing a plurality of scans of the touch-sensitive array using at least two different scan patterns. The plurality of scans captures response data for at least a subset of the plurality of sensor electrodes. The method further includes determining a signal direction for each sensor electrode in the subset using the response data. The signal direction for each sensor electrode indicates a relative location of a sensor electrode in the subset most responsible for creation of the signal direction (e.g., indicates an epicenter of a touch event). The method further includes identifying one or more touch zones, each including a group of sensor electrodes with signal directions that point towards a peak electrode response included in the group. The peak electrode response indicates a location of a candidate touch object on the touch-sensitive array. For each identified touch zone, the method further includes reporting a touch object at the location associated with the peak electrode response in accordance with a determination that the peak electrode response for the touch zone satisfies a predefined response threshold.

In some implementations, performing the plurality of scans of the touch-sensitive array includes performing at least four different scan patterns.

(A2) In some implementations of the method of A1, the method further includes, at the touch-sensitive device, for each identified touch zone, identifying a non-touch object at the location associated with the peak electrode response in accordance with a determination that the peak electrode response for the touch zone does not satisfy the predefined response threshold.

(A3) In some implementations of the method of any of A1-A2, the method further includes, at the touch-sensitive device, for each identified touch zone, contributing electrode responses from the group of sensor electrodes in the touch zone to the peak electrode response for the touch zone. Furthermore, reporting the touch object is further performed in accordance with a determination that the contributed peak electrode response for the touch zone satisfies the predefined response threshold.

(A4) In some implementations of the method of any of A1-A3, the method further includes, at the touch-sensitive device, for each identified touch zone, determining a shape of the touch zone. Furthermore, reporting the touch object is further performed in accordance with a determination that the shape of the touch zone satisfies a shape criterion.

(A5) In some implementations of the method of any of A4, the shape of the touch zone is associated with a drop, puddle, spray, rivulet, trail, or condensation of water.

(A6) In some implementations of the method of any of A1-A5, determining the signal direction for each sensor electrode in the subset includes: (i) determining a first axis signal direction for each sensor electrode in the subset and determining a second axis signal direction for each sensor electrode in the subset. Furthermore, in some implementations, determining the signal direction for each sensor electrode in the subset further includes: (i) determining whether the first axis signal direction for each sensor electrode in the subset satisfies a first direction threshold and (ii) determining whether the second axis signal direction for each sensor electrode in the subset satisfies a second direction threshold.

(A7) In some implementations of the method of A6, determining the first metric for the set of peaks based on the plurality of characteristic values includes combining the first axis signal direction with the second axis signal direction.

(A8) In some implementations of the method of any of A1-A7, the signal direction is a cardinal direction or a primary inter-cardinal direction.

(A9) In some implementations of the method of any of A1-A8, the method further includes, at the touch-sensitive device, storing the response data captured from the plurality of scans.

(A10) In some implementations of the method of any of A1-A9, identifying the one or more touch zones includes determining that multiple peak electrode responses are related to the same touch object by: (i) identifying a first group of sensor electrodes having signal directions that point towards a first peak electrode response included in the first group and (ii) identifying a second group of sensor electrodes having signal directions that point towards a second peak electrode response included in the second group. Furthermore, the first and second peak electrode responses are adjacent to one another and the signal directions for the first group of sensor electrodes mirror the signal directions for the second group of sensor electrodes.

(A11) In some implementations of the method of any of A1-A10, identifying the one or more touch zones includes determining that one or more electrode responses in the subset are related to a non-touch object by: (i) identifying a first group of sensor electrodes having signal directions that point in a first direction and (ii) identifying a second group of sensor electrodes having signal directions that point in a second direction. Furthermore, the second direction is opposite to the first direction and the first and second groups of sensor electrodes are adjacent to one another.

(A12) In some implementations of the method of any of A1-A11, identifying the one or more touch zones includes determining that multiple peak electrode responses are related to different touch objects by: (i) identifying a first group of sensor electrodes having signal directions that point towards a first peak electrode response included in the first group and (ii) identifying a second group of sensor electrodes having signal directions that point towards a second peak electrode response included in the second group. The first and second peaks are adjacent to and separated by at least one sensor electrode.

(A13) In some implementations of the method of any of A1-A12, the method further includes, at the touch-sensitive device, performing a plurality of additional scans of the touch-sensitive array using the at least two different scan patterns in response to identifying the one or more touch zones. Furthermore, reporting the touch object for each identified touch zone is further performed in accordance with a determination that the same touch zone is identified by the plurality of additional scans.

(A14) In some implementations of the method of any of A1-A13, one of the identified touch zones is positioned along an edge of the touch-sensitive array and the method further includes, at the touch-sensitive device, for the touch zone positioned along the edge of the touch-sensitive array: (i) determining a number of sensor electrodes in the touch zone that are adjacent to the edge of the touch-sensitive array and (ii) reporting a size of the touch object based at least in part on (a) a value of the peak electrode response for the touch zone and (b) the number of sensor electrodes in the touch zone that are adjacent to the edge of the touch-sensitive array.

(A15) In another aspect, a touch-sensitive device is provided (e.g., processing device 120, FIG. 1). The touch-sensitive device includes a touch-sensitive array that includes a plurality of sensor electrodes, one or more processors, and memory storing one or more programs, which when executed by the one or more processors cause the touch-sensitive device to perform the method described in any one of A1-A14.

(A16) In yet another aspect, a touch-sensitive device is provided and the touch-sensitive device (e.g., processing device 120, FIG. 1) includes means for performing the method described in any one of A1-A14.

(A17) In still another aspect, a non-transitory computer-readable storage medium is provided. The non-transitory computer-readable storage medium stores executable instructions that, when executed by the touch-sensitive device with one or more processors/cores, cause the touch-sensitive device to perform the method described in any one of A1-A14.

BRIEF DESCRIPTION OF THE DRAWINGS

For a better understanding of the aforementioned implementations of the invention as well as additional implementations thereof, reference should be made to the Detailed Description below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DETAILED DESCRIPTION

The various implementations described herein include systems, methods and/or devices used to reject false touches on a touch-sensitive array caused by water. Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

Figure 1:
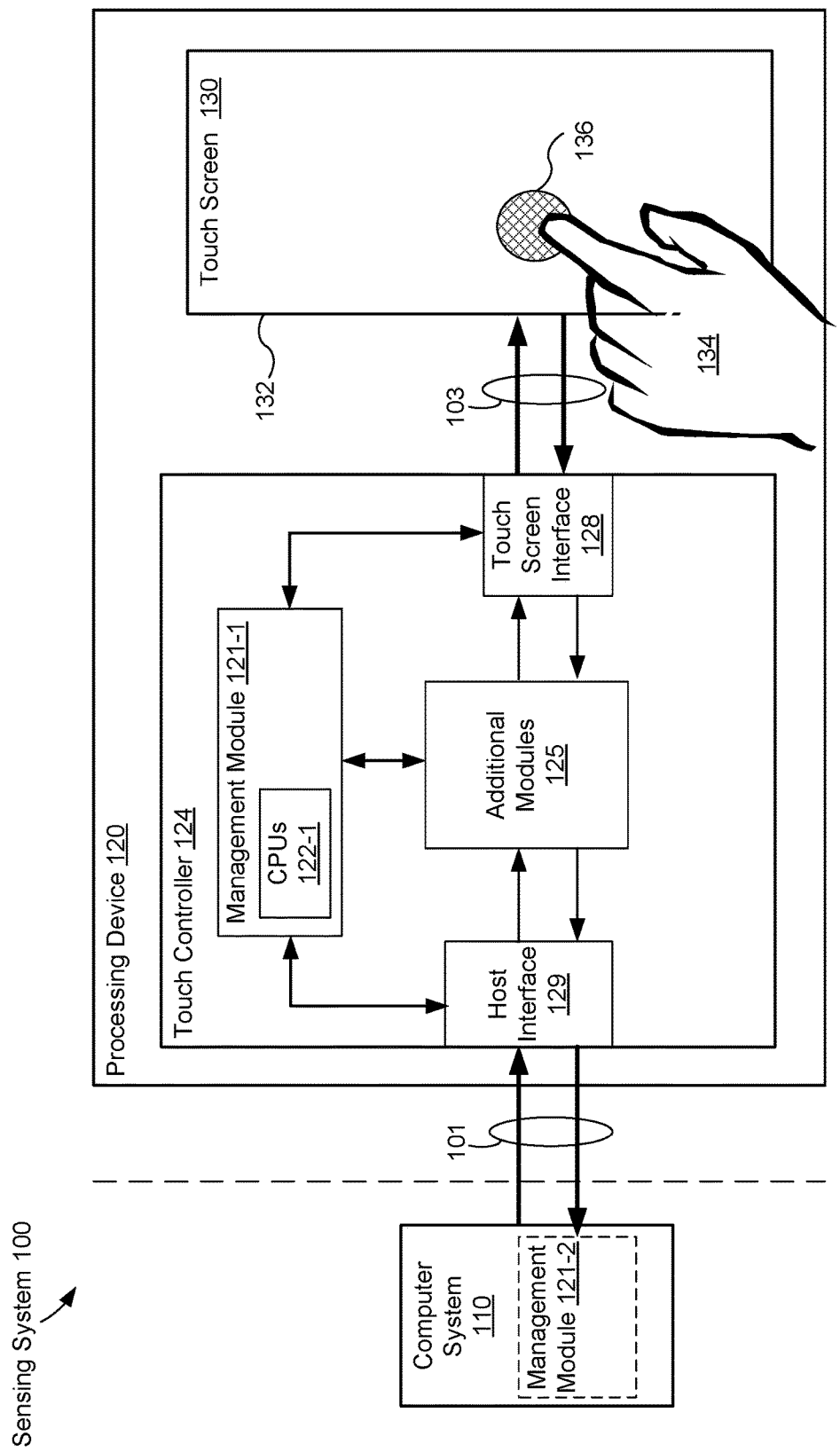
FIG. 1 is a block diagram illustrating a sensing system, in accordance with various implementations.

FIG. 1 is a block diagram illustrating a sensing system 100, in accordance with various implementations. While some example features are illustrated, various other features have not been illustrated for the sake of brevity and so as not to obscure pertinent aspects of the example implementations disclosed herein. To that end, as a non-limiting example, the sensing system 100 includes a processing device 120 (also referred to herein as a touch-sensitive device), which includes a touch controller 124 and a touch screen 130 (also referred to herein a touch-sensitive display), and is used in conjunction with, or includes, a computer system 110 (e.g., a host system or a host computer). In some implementations, the sensing system 100 provides the functionality of a touch screen, a touchpad, a slider, a button, a switch, a level sensor, a proximity sensor, a displacement sensor, a combination thereof, or provides some other functionality based on a detection of a user input.

In some implementations, the processing device 120 includes a mobile device, such as a mobile phone or tablet computer. In some implementations, the processing device 120 includes a wearable device, such as a smart watch or bracelet. In some implementations, the sensing system 100 includes a mobile device or a wearable device, or any other touch-sensitive device (e.g., bicycle computer, navigation device, home appliance, and the like).

In some implementations, non-volatile memory in the processing device 120 stores program instructions. In some implementations, the methods described herein are embodied in these program instructions. In some implementations, the processor 120 fetches and executes the program instructions. In some implementations, volatile memory (or non-volatile memory) is used to store data, including response data captured during a plurality of scans of the touch screen 130 (discussed below). In some implementations, a touch screen interface 128 acts as an interface between the touch screen 130 and the processor device 120. In some implementations, under control of the processor 120 (or the touch controller 124), the touch screen interface 128 scans the touch panel and generates response data (e.g., raw sensor data) from the touch screen 130.

The computer system 110 is coupled to the touch controller 124 through data connections 101. However, in some implementations the computer system 110 includes the touch controller 124, or a portion of the touch controller 124, as a component and/or as a subsystem. For example, in some implementations, some or all of the functionality of the touch controller 124 is implemented by software executed on the computer system 110. The computer system 110 may be any suitable computer device, such as a laptop computer, a tablet device, a netbook, a personal digital assistant, a mobile phone, a smart phone, a gaming device, a computer server, or any other computing device. The computer system 110 is sometimes called a host or a host system. In some implementations, the computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110.

The touch screen 130 is coupled to the touch controller 124 through the connections 103. In some implementations, connections 103 convey raw sensor data (e.g., response data) and/or control signals. In some implementations, however, the touch controller 124 and the touch screen 130 are included in the same device (i.e., an integrated electronic device) as components thereof. Furthermore, in some implementations, the touch controller 124 and the touch screen 130 are embedded in a host device (e.g., computer system 110), such as a mobile device, tablet, other computer or computer controlled device, and the methods described herein are performed, at least in part, by the embedded the touch controller. The touch screen 130 includes a sensing array 132 (e.g., touch-sensing array 200, FIG. 2) that forms a touch-sensitive display. In some implementations, the sensing array 132 includes one or more of light-sensitive elements, light emitting elements, photosensitive elements, pressure sensitive elements, and/or capacitive sensor elements (also referred to as sensor electrodes and simply sensor elements). The capacitive sensor elements are electrodes of conductive material, such as copper. The sensing array 132 is sensitive to an input object 134 at a location 136 (e.g., a user's finger or a stylus).

In some implementations, a touch controller 124 includes a management module 121-1, a host interface 129, a touch screen interface 128, and additional module(s) 125. The touch controller 124 may include various additional features that have not been illustrated for the sake of brevity and so as not to obscure pertinent features of the example implementations disclosed herein, and a different arrangement of features may be possible. The host interface 129 provides an interface to the computer system 110 through the data connections 101. Similarly, the touch screen interface 128 provides an interface to the touch screen 130 though the connections 103.

In some implementations, a management module 121-1 (also referred to as sensing module) includes one or more processing units 122-1 (sometimes herein called CPUs, processors, or hardware processors, and sometimes implemented using microprocessors, microcontrollers, or the like) configured to detect (or process), via the sensing array 132, a presence of one or more input objects 134 proximate or in contact with one or more sensor electrodes of the sensing array 132. In some implementations, the management module 121-1 performs operations (e.g., scan operations) to sense, via the sensing array 132, signals indicating the presence of the one or more input objects (e.g., input object 134). In some implementations, the management module 121-1 detects a pressure applied to the touch screen 130, light (e.g., infrared light) associated with an input object, an image associated with an input object, a capacitance of the sensors and/or a change in capacitance of one or more of the sensor electrodes of the sensing array 132 when an input object is proximate to or in contact with the touch screen 130. The sensing ability of the sensing module 121-1 depends on the type of sensors used in the touch screen 130 (e.g., capacitance sensors such as self-capacitance sensors and/or mutual-capacitance sensors).

In some implementations, the one or more CPUs 122-1 of the management module 121-1 are shared by one or more components within, and in some cases, beyond the function of touch controller 124. The management module 121-1 is coupled to the host interface 129, the additional module(s) 125, and the touch screen interface 128 in order to coordinate the operation of these components. In some implementations, one or more modules of management module 121-1 are implemented in the management module 121-2 of the computer system 110. In some implementations, one or more processors of computer system 110 (not shown) are configured to execute instructions in one or more programs (e.g., in the management module 121-2). The management module 121-2 is coupled to the processing device 120 in order to manage the operation of the processing device 120.

The additional module(s) 125 are coupled to the touch screen interface 128, the host interface 129, and the management module 121-1. As an example, the additional module(s) 125 may include a memory module (e.g., memory 306, FIG. 3). In some implementations, the memory module stores detected electrode responses (e.g., response data), directional thresholds, previously determined baselines, previously determined signal directions, shape criteria, and the like. In some implementations, the additional module(s) 125 include analog and/or digital general purpose input/output ("GPIO") ports 107. In some implementations, the GPIO ports are coupled to a Programmable Interconnect and Logic ("PIL"), which acts as an interconnect between GPIO ports and a digital block array of the processing device 120. The digital block array may be configurable to implement a variety of digital logic circuits (e.g., DACs, digital filters, or digital control systems). In some implementations, the additional module(s) 125 include an analog block array that is used to implement a variety of analog circuits. The analog block array may also be coupled to the GPIO ports.

In some implementations, the processing device 120 resides on a common carrier substrate such as, for example, an integrated circuit ("IC") die substrate, a multi-chip module substrate, or the like. In some implementations, the components of the processing device 120 may be one or more separate integrated circuits and/or discrete components. In some implementations, the processing device 120 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

Figure 2:
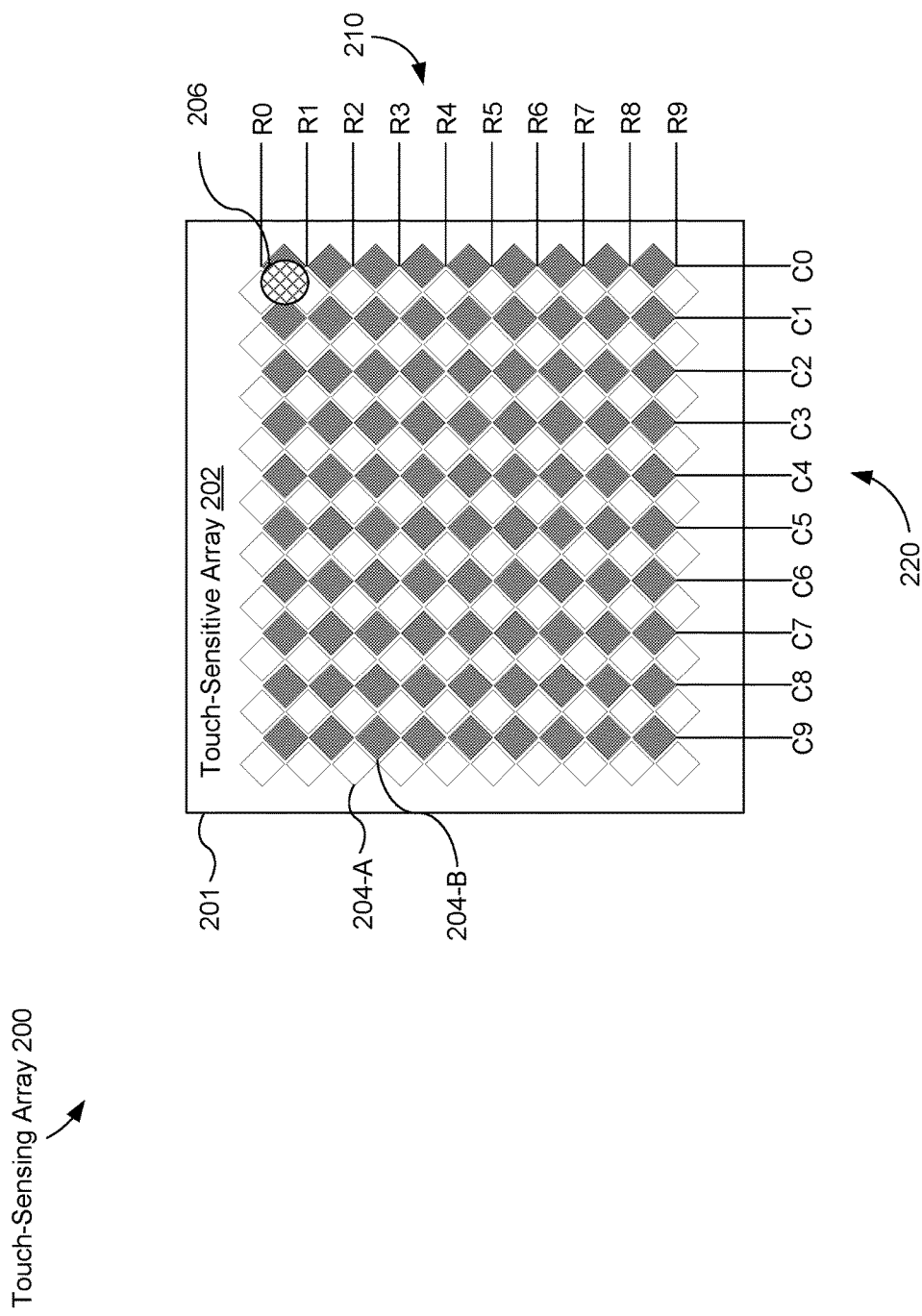
FIG. 2 is a diagram illustrating a touch-sensing array (e.g., a touch screen), in accordance with various implementations.

FIG. 2 is a diagram illustrating a touch-sensing array 200 (e.g., touch screen 130, FIG. 1) including a substrate 201 (e.g., a dielectric material) having a touch-sensitive array 202 (e.g., sensing array 132, FIG. 1), in accordance with various implementations. As shown, FIG. 2 includes rows R0-R9 210 and columns C0-C9 220 of sensor elements (e.g., sensor elements 204-A, 204-B, etc.) arranged in an array. The rows R0-R9 210 and the columns C0-C9 220 of sensor elements are coupled with a sensing module (e.g., management module 121-1, FIG. 1), and in turn the processing device 120. In the operations described in more detail below, each of the rows R0-R9 210 and columns C0-C9 220 of sensor elements may operate as both transmit and receive electrodes, depending on pin assignments.

In some implementations, the plurality of sensor electrodes 204 can be configured either as self-capacitance sensors or mutual-capacitance sensors. Within the touch-sensitive array 202 (e.g., a capacitance sense array), each of the rows R0-R9 210 of the sensor elements 204 crosses with each of the columns C0-C9 220 of the sensor elements 204. In this way, galvanic isolation is maintained between the rows R0-R9 210 and the columns C0-C9 220. In some implementations, each of the columns C0-C9 220 are associated with an X-coordinate or range of X-coordinates of the X-Y plane and each of the rows R0-R9 210 are associated with a Y-coordinate or range of Y-coordinates of the X-Y plane. In this way, the sensing module can determine a location (e.g., touch location 136, FIG. 1) of a touch 206 on the touch-sensitive array 202 using X and Y coordinates of the touch 206.

It should be understood that although the plurality of sensor electrodes 204 are shown to be diamond shaped, one or more of the sensor elements 204 may be formed of other shapes (e.g., lines, stripes, bars, triangles, snowflakes, and/or any other shape) and be organized in various other patterns (e.g., intersections, concentric circles, saw tooth pattern, Manhattan pattern, and/or other patterns) without departing from the claimed subject matter. In some implementations, the sensor elements 204 cover all or a portion of the surface area of the substrate 201. In some implementations, the sensor elements 204 and patterns of the sensor elements 204 are formed on or through one or more layers on the substrate 201.

It should also be understood that although the touch-sensitive array 202 illustrated includes a same number of rows and columns, the touch-sensitive array 202 optionally includes a different number of rows and columns (e.g., 10 rows and 5 columns). Moreover, although the touch-sensitive array 202 illustrated includes a same number of elements in each column of C0-C9 220, the touch-sensitive array 202 optionally includes different numbers of sense elements in each column, or in a subset of the columns. For example, in one implementation, C0 consists of 10 elements, C1 consists of 8 elements, C2 consists of 10 elements, C3 consists of 12 elements, C4 consists of 10 elements, C5 consists of 15 elements, and so on. Similarly, the touch-sensitive array 202 optionally includes different numbers of elements in each row, or in a subset of the rows.

In addition, the touch-sensitive array 202 may take many forms known by those skilled in the art. For example, the touch-sensitive array 202 may have rows and columns specifically designed for self-capacitance sensing, mutual-capacitance sensing, or a combination of the two. In addition, although not shown, the touch-sensitive array 202 may be a self-capacitance multi-pad array, at least in some implementations.

In some implementations, the processing device 120 (FIG. 1) or one or more components of the processing device 120 (e.g., management module 121-1, FIG. 1) measures capacitance of the plurality of sensor electrodes 204 using self-capacitance sensing. In some implementations, self-capacitance sensing measures added (or subtracted) capacitance at respective electrodes of the plurality of sensor electrodes 204. For example, a user's touch (e.g., a finger) at a specific sensor electrode (e.g., sensor electrode 204-A) increases capacitance at the specific sensor electrode because the finger's capacitance is added to the capacitance of the specific sensor electrode. The processing device detects a "touch" when the added capacitance to the specific sensor electrode satisfies a predefined threshold. Alternatively, water (e.g., rain droplets, sweat spray, puddle around user's finger, etc.) at one or more sensor electrodes (e.g., sensor electrode 204-A) may also increase (or decrease) capacitance at the one or more sensor electrodes. As such, the processing device may detect a "touch" caused by water when the added capacitance to the specific sensor electrode satisfies the predefined threshold. In other words, the processing device may improperly report a touch in some circumstances, at least while using conventional touch sensing techniques.

In some implementations, the processing device measures capacitance of the plurality of sensor electrodes 204 using mutual-capacitance sensing. In some implementations, mutual-capacitance sensing measures capacitance between a column electrode (e.g., a transmit (TX) electrode), and a row electrode (e.g., a receive (RX) electrode). For example, mutual-capacitance sensing measures a change (e.g., a decrease or increase) in capacitance between the column electrode (e.g., sensor electrode 204-A) and the row electrode (e.g., sensor electrode 204-B) resulting from a user's touch (e.g., a finger). Again, water (e.g., rain droplets, sweat spray, etc.) may cause measurable changes in mutual-capacitance. Furthermore, in some circumstances, the touch-sensitive device may include a metal bezel (e.g., a metal bezel around a perimeter of a wearable device), which may ground water located on the touch-sensitive display. In these circumstances, the measurable changes caused by water are increased, resulting in electrode responses that substantially mirror electrode responses caused by a user's finger.

Figure 3:
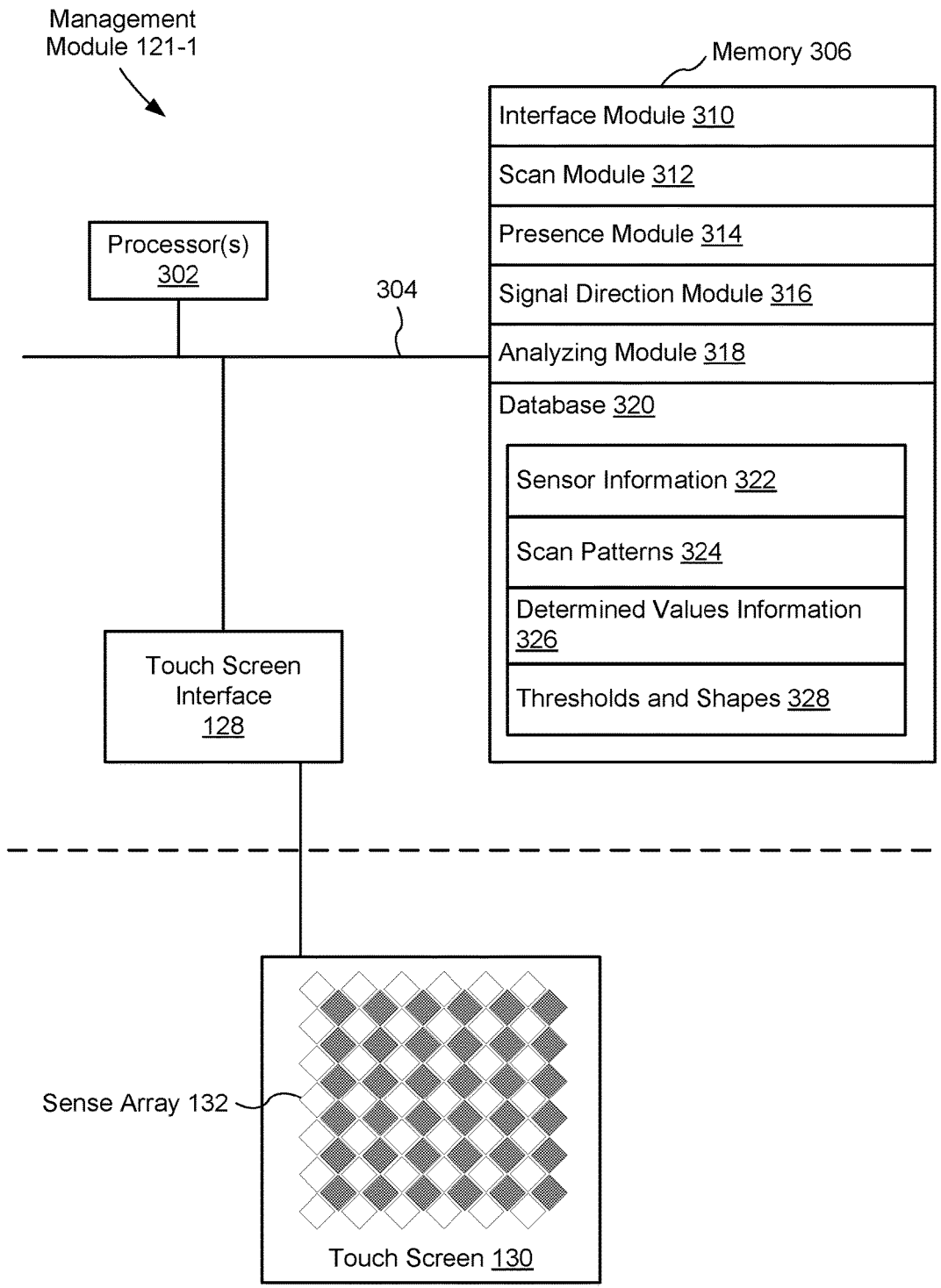
FIG. 3 is a block diagram illustrating an implementation of a touch-sensitive device, in accordance with some implementations.
Figure 6A:
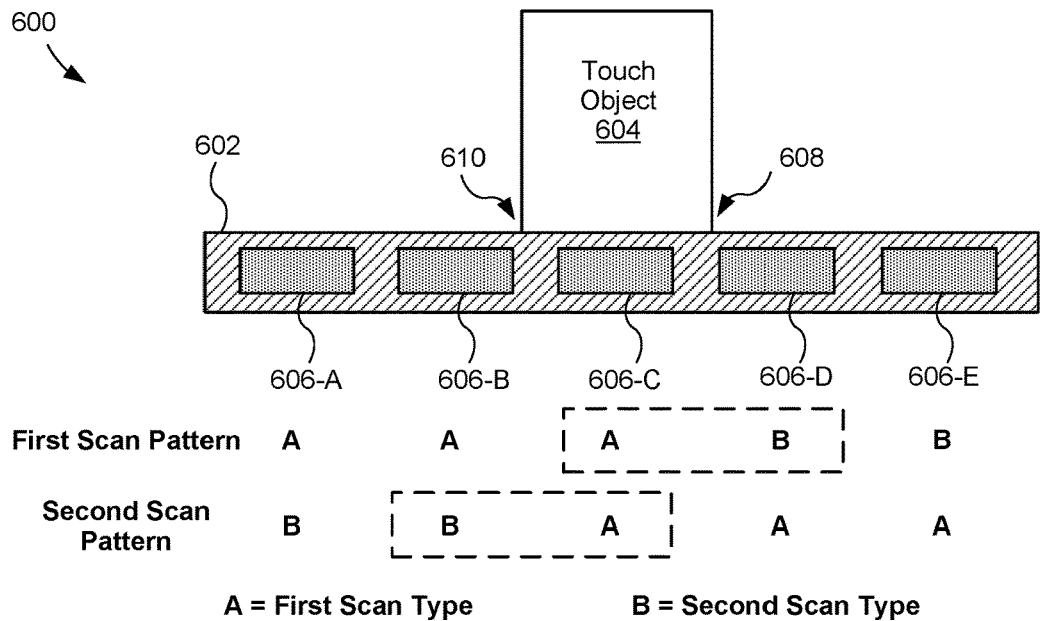
FIGS. 6A-6B illustrate cross-sectional views of a touch-sensitive array during a directional scanning operation, in accordance with some implementations.
Figure 6B:
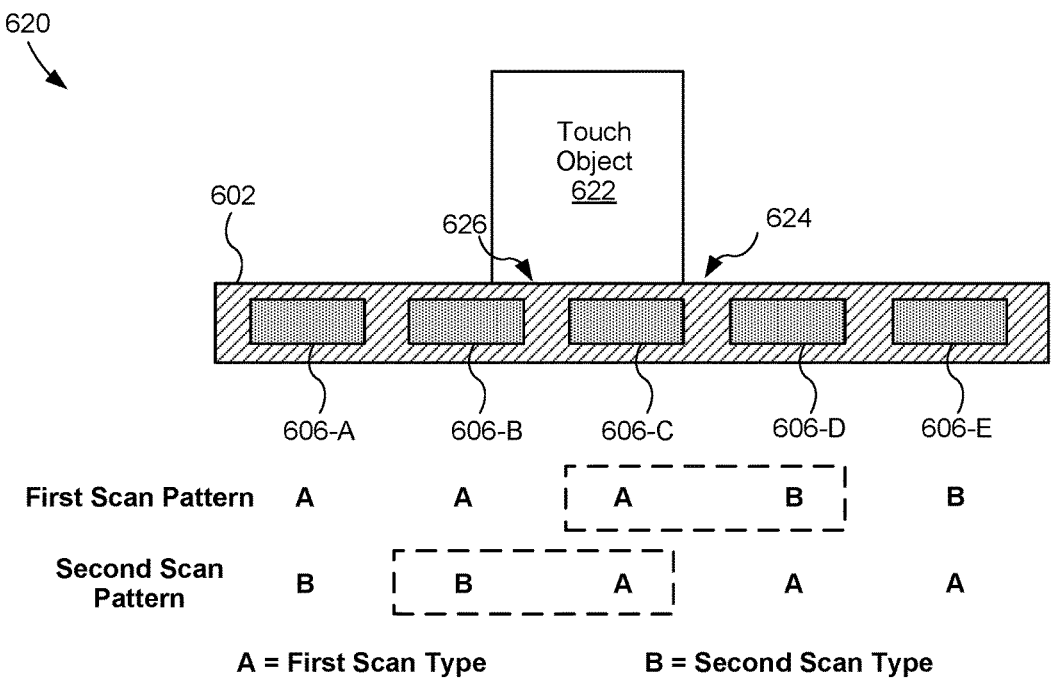

FIG. 3 is a block diagram illustrating an implementation of a management module 121-1 (FIG. 1). The management module 121-1 typically includes one or more processing units 302 (sometimes herein called CPUs, processors, or hardware processors, and sometimes implemented using microprocessors, microcontrollers, or the like) for executing modules, programs and/or instructions stored in memory 306 and thereby performing processing operations, memory 306 and one or more communication buses 304 for interconnecting these components. The communication buses 304 optionally include circuitry (sometimes called a chipset) that interconnects and controls communications between system components. In some implementations, the management module 121-1 is coupled to a touch screen (e.g., touch screen 130, FIG. 1, and in turn, sense array 132) by the communication buses 304 and the touch screen interface 128. In some implementations, the memory 306, or the computer readable storage medium of the memory 306 stores the following modules and data used by the modules:

an interface module 310 that is used for communicating with other components of the touch-sensitive device;

a scan module 312 that is used for scanning the sense array 132 and for converting sensor signals (e.g., convert analog signals, such as voltage and/or change, into digital signals, or vice versa). In some implementations, the scan module 312 scans the sense array 132 using a plurality of different scan patterns (e.g., scan patterns 324);

a presence module 314 that is used for detecting presence of an object (e.g., a user's finger, a stylus, a liquid, etc.), or lack of an object. In some implementations, the presence module 314 obtains response data (e.g., electrode responses) when detecting the presence of the object;

a signal direction module 316 that is used for determining a signal direction for sensor electrodes in the touch-sensitive array using response data obtained by the presence module 314; and an analyzing module 318 that is used for analyzing signal directions determined by the signal direction module 316 and response data obtained by the presence module 314; and database 320, including but not limited to:

sensor information 322 for storing and managing response data received, detected, and/or transmitted by one or more sensor electrodes of the touch-sensitive array;

scan patterns 324 (e.g., the first scan pattern and the second scan pattern, FIGS. 6A-6B);

determined signal direction information 326 for storing and managing signal directions and other values determined by the analyzing module 318; and thresholds (e.g., a predefined response threshold, direction thresholds, etc.) and shapes 328 (e.g., shape criterion and/or shapes associated with water events).

In some implementations, the scan module 312 uses a multiplexer or switch matrix (not shown) to distribute signals to one or more sensor electrodes. In some implementations, the scan module 312 uses the same or a different multiplexer (not shown) to receive current from the one or more sensor electrodes. This configuration allows the scan module 312 to scan all or specific portions of the capacitive sense array. In some implementations, scanning specific portions of the capacitive sense array (e.g., corner portions) consumes less energy compared to scanning the entire capacitive sensor array.

In some implementations, the analyzing module 320 determines whether one a group of sensor electrodes are related to one another (i.e., the group forms a touch zone) using the signal directions determined by the signal direction module 316. Touch zones are discussed in further detail below.

Each of the above identified elements may be stored in one or more of the previously mentioned memory devices that together form the memory 306, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, the memory 306 may store a subset of the modules and data structures identified above. Furthermore, the memory 306 may store additional modules and data structures not described above. For example, in some implementations, the memory 306 stores one or more water detection algorithms, determined metrics, touch object detection algorithms, and other relevant information. In some implementations, the programs, modules, and data structures stored in memory 306, or the computer-readable storage medium of the memory 306, provide instructions for implementing respective operations in the methods described below with reference to FIG. 6.

In some implementations, the touch controller 124 includes one or more processors for executing the modules, programs and/or instructions stored in the memory 306.

Figure 4A:
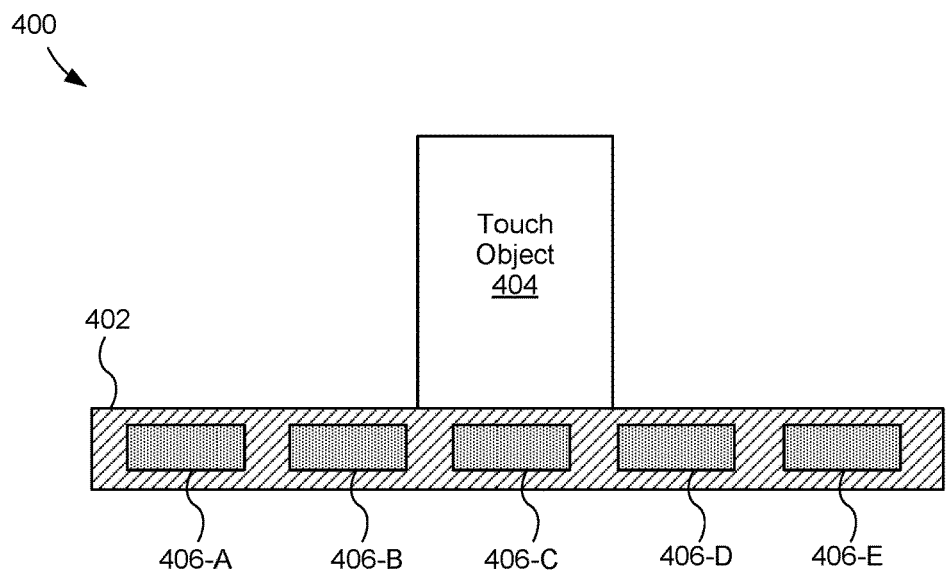
FIGS. 4A-4B illustrate a touch object contacting a touch-sensitive display and resulting electrode responses measured using conventional techniques, in accordance with some implementations.
Figure 4B:
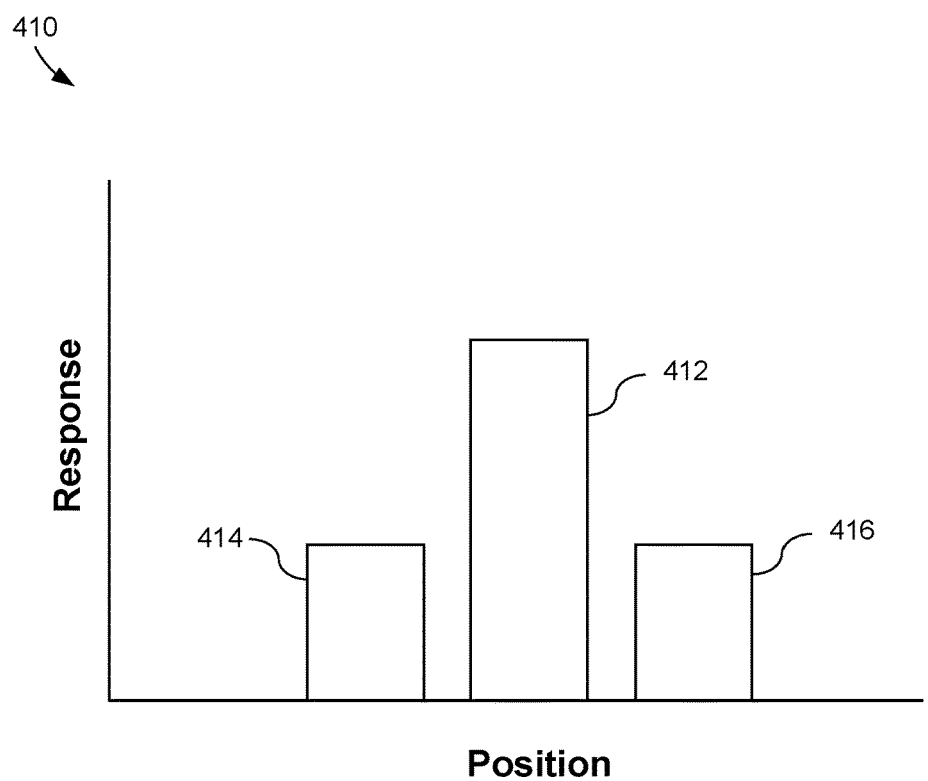

FIGS. 4A-4B illustrate a touch object contacting a touch-sensitive display and resulting electrode responses measured using conventional techniques. FIG. 4A shows a cross-sectional view a touch-sensitive array 402 (e.g., touch-sensitive array 202, FIG. 2) being contacted by a touch object 404. The touch-sensitive array 402 includes a plurality of sensor elements 406-A-406-E (e.g., sensor elements 204-A, 204-B, FIG. 2), and the touch object 404 is centered above sensor element 406-C with its perimeter proximate to sensor elements 406-B and 406-D. Accordingly, during a scanning operation (e.g., performed by processing device 120, FIG. 1), electrode responses are reported at sensor elements 406-B, 406-C, 406-D (e.g., mutual-capacitance and/or self-capacitance measurements reported). In this example, the touch-sensitive array 402 is free of debris/liquids, which generally affect reporting of electrode responses. In the absence of these contaminates, conventional techniques typically can be used to accurately report electrode responses on the touch-sensitive array 402.

FIG. 4B illustrates a prophetic diagram of electrode responses resulting from the touch object 404 contacting the touch-sensitive array 402 in FIG. 4A. As shown, a maximum electrode response 412 is reported for the sensor element 406-C because the touch object 404 is centered above the sensor element 406-C (e.g., greatest change in capacitance occurs at sensor element 406-C due to interference from the touch object 404). In addition, electrode responses 414, 416 are reported for the sensor elements 406-B, 406-D because the touch object 404 is proximate to the sensor elements 406-B, 404-D (e.g., change in capacitance occurs at both sensor elements 406-B, 406-D due to interference from the touch object 404). The processing device may report a touch position of the touch object 404 using the results shown in FIG. 4B (e.g., report, to the host 110, the touch position being at sensor element 406-C).

Figure 5A:
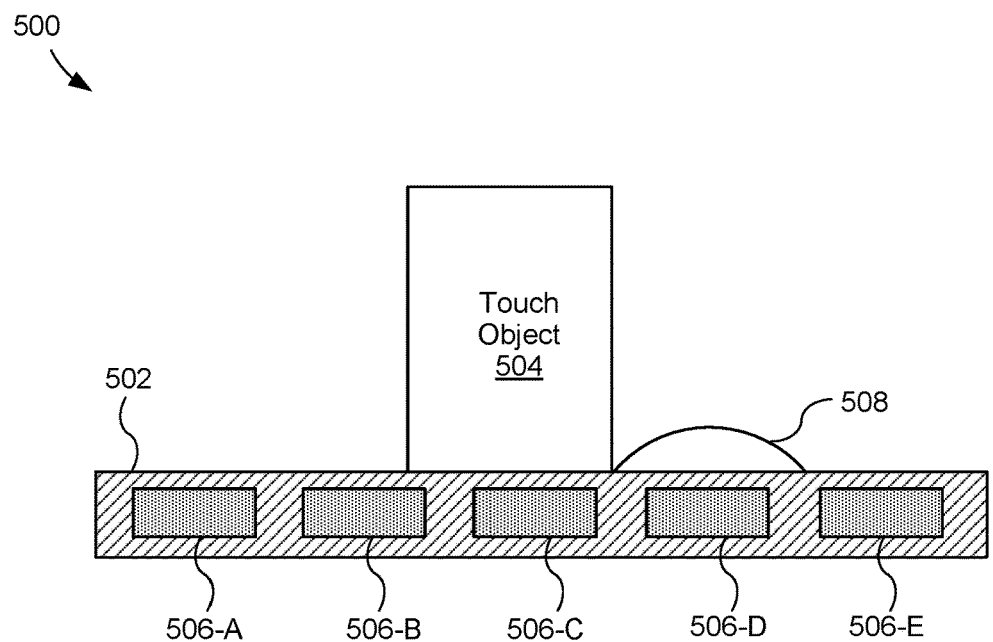
FIGS. 5A-5B illustrate a touch object and water contacting a touch-sensitive display and resulting electrode responses measured using conventional techniques, in accordance with some implementations.
Figure 5B:
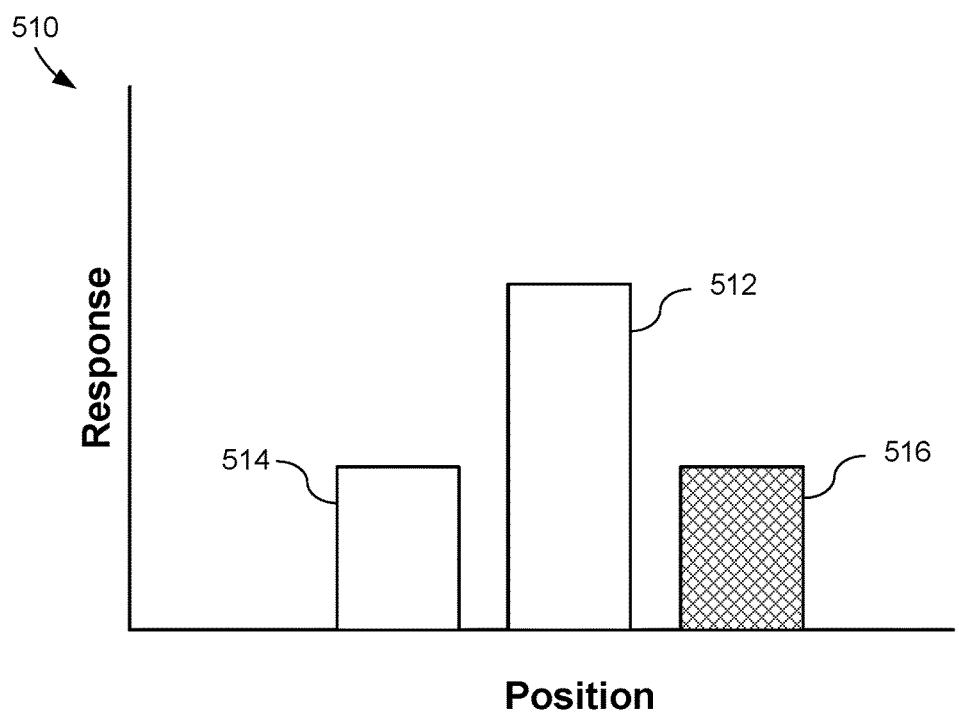

FIGS. 5A-5B illustrate a touch object and water contacting a touch-sensitive display and resulting electrode responses measured using conventional techniques. Model 500 shows a cross-sectional view of a touch-sensitive array 502 being contacted simultaneously by a touch object 504 and a drop of water 508. The touch-sensitive array 502, again, includes a plurality of sensor elements 506-A-506-E. In this example, the touch object 504 is not centered above sensor element 506-C but is instead shifted slightly to the left of center such that a first portion of the touch object 504 is positioned above sensor element 506-C and a second portion of the touch object 504 is positioned above sensor element 506-B. Additionally, no portion of the touch object 504, due to the shifting, is positioned above the sensor element 506-D (or a portion of the touch object 504 is less proximate to the sensor element 506-D relative to the proximity illustrated in FIG. 4A). Accordingly, in the absence of the drop of water 508, electrode responses for the situation illustrated in FIG. 5A would differ from electrode responses for the situation illustrated in FIG. 4A (i.e., due to the shifting). However, due to the presence of the water 508, the electrode responses shown in FIG. 5B are substantially similar to the electrode responses shown in FIG. 4B.

FIG. 5B illustrates a prophetic diagram 510 of electrode responses resulting from the touch object 504 and the water 508 contacting the touch-sensitive array 502. As shown, a maximum electrode response 512 is reported for the sensor element 506-C because a majority of the touch object 504 is positioned above the sensor element 506-C. In addition, an electrode responses 514 is reported for the sensor element 506-B because the second portion of the touch object 504 is positioned above sensor element 506-B. Moreover, an electrode response 516 is reported for the sensor element 506-D because the drop of water 508 is positioned above sensor element 506-D. Accordingly, a touch position reported by the processing device matches the touch position reported shown in FIG. 4B. However, as shown in FIGS. 4A and 5A, the respective touch positions are not matching. As such, an inaccurate touch position is reported due to the drop of water 508 contacting the touch-sensitive display. Unfortunately, conventional touch sensing techniques cannot identify the drop of water 508 and remove the effect of the drop of water 508 when reporting the touch position. In light of this, additional touch sensing techniques (discussed below) can be implemented separately or in combination with the conventional techniques to overcome the shortcoming discussed above (e.g., an algorithm for water detection may trigger implementation of the additional touch sensing techniques discussed below).

An additional touch sensing technique described herein is referred to as directional scanning. Directional scanning is used to determine a "direction" of each signal (e.g., electrode response) of the touch-sensitive array (e.g., east, west, north, south, northwest, southwest, etc.). The "direction" indicates a relative location of a sensor element most responsible for creation of each signal. For example, if a direction for a first sensor element points towards a second sensor element, then the second sensor element is more responsible for the signal. This is particularly useful when a touch object is not perfectly centered above a single sensor element (discussed in more detail below). In addition, directional scanning can be used to isolate other electrode responses, which may correspond to a false touch (e.g., one caused by water). FIG. 6A illustrates one implementation of the directional scanning technique.

FIG. 6A illustrates a cross-sectional view of a touch-sensitive array 602 during a directional scanning operation 600. The touch-sensitive array 602 includes a plurality of sensor elements 606-A-606-E. In this example, for ease of discussion, the touch object 604 is centered above sensor element 606-C with its perimeter proximate to sensor elements 606-B and 606-D. To determine a "direction" of a signal caused by the touch object 604, the processing device (e.g., processing device 110, FIG. 1) performs a plurality of different scan patterns at respective sensor elements to determine directional contributions caused by the touch object 604 (e.g., determine a signal direction of sensor element 606-A, determine a signal direction of sensor element 606-B, and so on). In some implementations, to determine a signal direction, the processing device may perform two scans for respective TX elements in the touch-sensitive array (e.g., east and west scans) and two scans of respective RX elements in the touch-sensitive array (e.g., north and south scans). In some implementations, the processing device performs the two scans of the respective TX elements and then performs the two scans of the respective RX elements, or vice versa (or some other combination). To illustrate, the processing device may perform two scans of a first respective TX element, perform two scans of a first respective RX element, perform two scans of a second respective TX element, perform the two scans of a second respective RX element, and so on (or vice versa).

The processing device may determine a first axis signal direction (e.g., east-west axis) for a respective sensor element (also referred to herein as a sensor electrode) during a first set of scans and may determine a second axis signal direction (e.g., north-south axis) for the respective sensor element during a second set of scans (or vice versa). In some implementations, the processing device combines the first axis signal direction and the second axis signal direction to determine the signal direction for the respective sensor electrode (discussed in more detail below). Although the examples below discuss east-west components of the signal direction being determined before the north-west components, one skilled in the art will appreciate that, at least in some implementations, the north-south components may be determined before the east-west components, or in some other order. In addition, in some circumstances, the east-west components are associated with TX sensor elements and the north-south components are associated with RX sensor elements. However, in some other circumstances, the east-west components are associated with RX sensor elements and the north-south components are associated with TX sensor elements.

For ease of discussion, FIG. 6A will be assumed to show an east-west axis of the touch-sensitive array 602 and the sensor elements 606-A-606-E will be assumed to be TX sensor elements. As such, a first scan pattern is an "east" scan pattern (i.e., scanning the touch-sensitive array from right to left) and a second scan pattern is a "west" scan pattern (i.e., scanning the touch-sensitive array from left to right). Accordingly, a first scan using the first scan pattern identifies an east component of an electrode response for sensor element 606-C and a second scan using a second scan pattern identifies a west component of the electrode response for sensor element 606-C.

The first scan pattern includes a point of interest 608 formed between a first scan type A (e.g., a normal TX square wave) and a second scan type B (e.g., an inverted TX square wave) (dotted box). In some implementations, the processing device creates one point of interest for each scan pattern. Accordingly, during a first scan using the first scan pattern, reporting of electrode responses is limited to the point of interest 608 (i.e., a single electrode response, or lack thereof, is reported for the point of interest 608). In this way, the processing device isolates an east component of the electrode response for sensor element 606-C (e.g., isolates the electrode response at an east edge of sensor element 606-C).

The second scan pattern includes a point of interest 610 between a first scan type A and a second scan type B (dotted box). The second scan pattern is used to determine a west component of the electrode response for sensor element 606-C. Accordingly, during a second scan using the second scan pattern, reporting of electrode responses is limited to the point of interest 610. In this way, the processing device isolates the west component of the electrode response for sensor element 606-C (e.g., isolates the electrode response at a west edge of sensor element 606-C).

After determining the east and west components for the sensor element 606-C, the processing device determines a signal direction along the east-west axis of the touch-sensitive array 602 for the sensor element 606-C. The processing device combines the east and west components to determine the signal direction along the east-west axis (discussed in more detail below).

In some implementations, the processing device performs two scans of respective RX elements in the touch-sensitive array (e.g., south and north scans) to determine south and north components of the electrode response for a respective sensor element. For example, although not shown, a third scan pattern may include a point of interest between two different scan types. The third scan pattern may be used to determine a south (or north) component of the electrode response for sensor element 606-C. Accordingly, during a third scan using the third scan pattern, reporting of electrode responses is limited to the point of interest. In this way, the processing device isolates the south (or north) component of the electrode response for sensor element 606-C (e.g., isolates the electrode response at a south edge (or north edge) of sensor element 606-C). The process is repeated to determine a north component (or south component, depending on the order) during a fourth scan.

After determining the south and north components for the sensor element 606-C, the processing device determines a signal direction along the north-south axis of the touch-sensitive array 602 for the sensor element 606-C. The processing device combines the south and north components to determine the signal direction along the north-south axis (discussed in more detail below).

Thereafter, the processing device may combine the signal direction along the north-south axis with the signal direction along the east-west axis (discussed in more detail below). The results of said combination are shown in FIG. 7B.

Because the west and east components are determined by manipulating TX elements (e.g., modifying scan patterns to create points of interest), the south and north components may be determined by manipulating the RX elements. In some implementations, the processing device forms a point of interest (e.g., similar to point of interest 608) during a scan pattern by grounding a neighboring RX element. For example, using FIG. 6A as a reference, sensor element 606-C may experience normal RX scanning (e.g., the first scan pattern) while sensor element 606-D may be grounded (e.g., the second scan pattern). In some circumstances, results (e.g., electrode responses) from grounding a neighboring RX element may be substantially less than results from swapping pin assignments. Accordingly, the processing device may normalize responses captured during grounding implementations. In this way, the north and south components determined from the grounding implementations may be compared to direction thresholds (e.g., direction thresholds 702, 704, FIG. 7A) used for the east and west components.

In some implementations, the processing device temporarily swaps pin assignments of the RX/TX pins to determine the south and north components. This approach avoids having to normalize responses.

Although not shown, the processing device performs the process described above for each of the sensor elements in the touch-sensitive array (or at least a subset, depending on the circumstances). For example, after determining the signal direction for sensor element 606-C, the processing device repeats the process for sensor element 606-B (or sensor element 606-D, or some other sensor element). To repeat the process for sensor element 606-B, the processing device shifts the first and second scan patterns accordingly (e.g., shifts points of interest 608 and 610 to the left one sensor element such that point of interest 608 becomes point of interest 610 and a new point of interest is formed between sensor elements 606-A and 606-B). In those implementations involving the third and fourth scan patterns, the processing device also shifts the third and fourth scan patterns accordingly.

FIG. 6B illustrates another directional scanning operation 620. As shown, the touch-sensitive array 602 is contacted by a touch object 622. In this example, the touch object 622 is not centered above sensor element 606-C, but is instead shifted slightly to the left of center such that a first portion of the touch object 622 is positioned above sensor element 606-C and a second portion of the touch object 622 is positioned above sensor element 606-B. Accordingly, results from first and second scans shown in FIG. 6B will differ from the results of the first and second scans shown in FIG.

6A. For ease of discussion, FIG. 6B will also be assumed to show an east-west axis of the touch-sensitive array 602 and the sensor elements 606-A-606-E will be assumed to be TX sensor elements.

The first scan pattern includes a point of interest 624 between a first scan type A and a second scan type B (dotted box). By performing a first scan using the first scan pattern, the processing device captures an electrode response (or lack thereof) at the point of interest 624, which corresponds to an east component of the electrode response for sensor element 606-C.

The second scan pattern includes a point of interest 626 between a first scan type A and a second scan type B (dotted box). By performing a second scan using the second scan pattern, the processing device captures an electrode response (or lack thereof) at the point of interest 626, which corresponds to a west component of the electrode response for sensor element 606-C.

After determining the east and west components for the sensor element 606-C (in both FIGS. 6A-6B), the processing device can determine a signal direction for the east-west axis for the sensor element 606-C by combining the east and west components. For example, the processing device may subtract the east component from the west component, or vice versa. In another example, the processing device performs some other mathematic operation to determine a degree of similarity between the east and west components. In some circumstances, the east and west components are substantially equal. For example, referring to FIG. 6A, the processing device may determine that the east component in FIG. 6A is "X" and that the west component is approximately "X." Accordingly, subtracting "X" from approximately "X" results in a "null" outcome (i.e., the signal direction for the sensor element 606-C along the east-west axis is "null").

In some circumstances, however, the east and west components are not substantially equal. For example, referring to FIG. 6B, the processing device may determine that the east component in FIG. 6B is "X" and that the west component is not approximately "X," but is instead "Y." The difference between the east and west components results from the touch object 622 not being centered above sensor element 606-C (e.g., shifted slightly to the left of center). Because of this, the west component of the sensor element 606-C is substantially greater than the east component (e.g., greater change in capacitance is measured at point of interest 626 relative to capacitance measured at point of interest 624). Accordingly, a signal direction for the sensor element 606-C along the east-west axis would be "west" (i.e., to the left).

As noted above, the processing device performs the process described above for at least a subset of the sensor elements in the touch-sensitive array. For example, with reference to FIG. 6B, the processing device may determine east and west components for sensor element 606-B. As such, a first scan pattern may include a first point of interest for an east edge of the sensor element 606-B and a second scan pattern may include a second point of interest for a west edge of the sensor element 606-B. By performing first and second scans using the first and second scan patterns, respectively, the processing device determines east and west components for the sensor element 606-B. In this case, the processing device may determine that the east component is "X" and that the west component is approximately zero because the touch object 622 is not proximate the west edge of sensor element 606-B. Accordingly, a signal direction for the sensor element 606-B along the east-west axis would be "east" (i.e., to the right).

In some implementations, the processing device determines a relative position of the touch object using signal directions from neighboring sensor elements (e.g., east-west signal directions, north-south signal directions, or a combination of the two). For example, referring to FIG. 6B, the signal direction for the sensor element 606-B along the east-west axis is "east" (i.e., to the right) and the signal direction for the sensor element 606-C along the east-west axis is "west" (i.e., to the left). As such, the processing device can determine that the relative position of the touch object 622 is between sensor elements 606-B and 606-C or at least not centered above one of the sensor elements (additional information, such as magnitude of electrode response at each sensor element can further be used to pinpoint the position of the touch object).

Figure 7A:
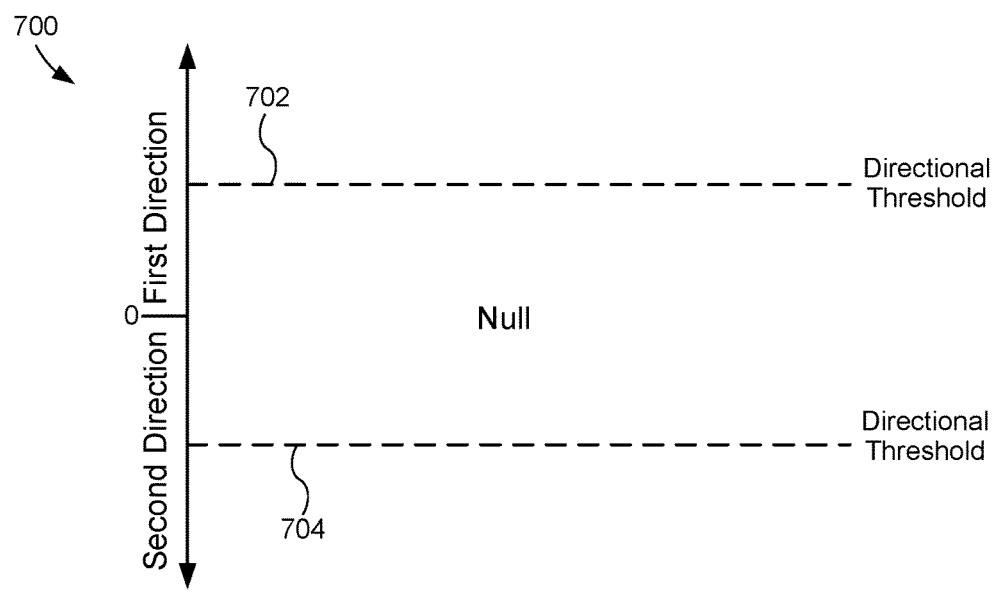
FIG. 7A illustrates a direction threshold diagram used for directional scanning, in accordance with some implementations.
Figure 7B:
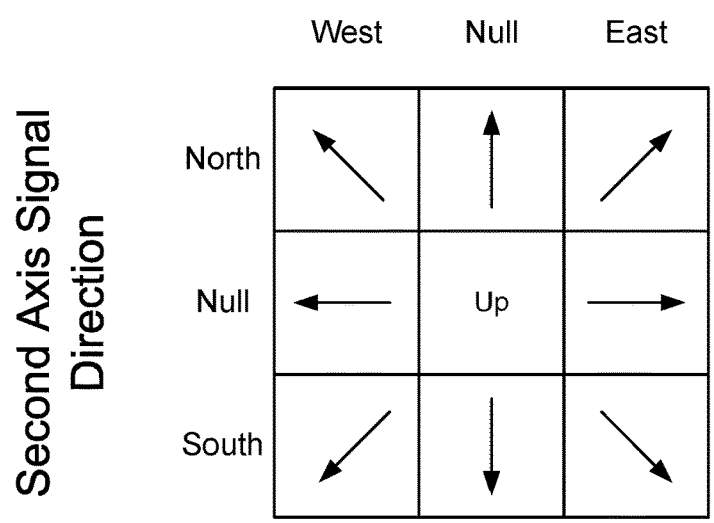
FIG. 7B illustrates possible signal direction outcomes for a respective sensor element of the touch-sensitive array.

FIG. 7A illustrates a direction threshold diagram 700. The diagram 700 includes a first direction threshold 702 (e.g., east direction threshold) and a second direction threshold 704 (e.g., west direction threshold). The processing device may compare a signal direction for a respective sensor element with the thresholds 702, 704. For example, the signal direction for the sensor element 606-C along the east-west axis in FIG. 6A may be compared against the thresholds. As noted above, the signal direction for the sensor element 606-C along the east-west axis in FIG. 6A is "null," and therefore, neither of the thresholds 702, 704 would be satisfied. However, the signal direction for the sensor element 606-C along the east-west axis in FIG. 6B is "west," and therefore, this signal direction is compared to the corresponding direction threshold (e.g., west direction threshold 704). In accordance with a determination that the signal direction satisfies the corresponding direction threshold, the processing device assigns the signal direction for the axis to the respective sensor element. For example, the signal direction assigned to the sensor element 606-C along the east-west axis in FIG. 6B would be "west."

In accordance with a determination that the signal direction does not satisfy any of the corresponding direction thresholds, the processing device assigns an "up" direction to the respective sensor element (e.g., signal direction for sensor element 606-C FIG. 6A is "up," which results from multiple "null" outcomes). In some implementations, if the signal direction along a particular axis does not satisfy the corresponding direction threshold, then the processing device may determine that the touch object is positioned at a threshold distance between two sensor elements, or is centered above a sensor element (e.g., as shown in FIG. 6A).

Although not shown, the processing device may also determine a signal direction along the north-south axis for the respective sensor element. After determining the signal direction along the north-south axis for the respective sensor element, the processing device combines the signal direction determined for the north-south axis with the signal direction determined for the east-west axis. In doing so, an overall signal direction (simply referred to as the signal direction) is determined for the respective sensor element. FIG. 7B illustrates possible signal direction outcomes for a respective sensor element. For example, a signal direction outcome for a particular sensor element may be: (i) "up" (corresponds to multiple "null" outcomes); (ii) a cardinal direction (e.g., north, south, east, west); or (iii) a primary inter-cardinal direction (e.g., northwest, southwest, etc.).

In some implementations, the processing device reduces a number of scans in the plurality of scans to conserve time and energy. In some implementations, to conserve time and energy, the processing device performs a directional scan operation at predefined intervals. For example, the processing device may perform a directional scan operation every nth scan (e.g., every third, or some lesser (or greater) interval) or after X amount of time has elapsed. In some implementations, to conserve time and energy, the processing device limits an amount of pulses performed during a directional scan operation, relative to an amount of pulses performed during conventional techniques. In some implementations, to conserve time and energy, the processing device assumes that a size of a touch object is equal to or less than a predefined number of sensor elements (e.g., two sensor element, or some greater (or lesser) amount). In doing so, the processing device can modify the scan patterns according to the assumed size.

Figure 8A:
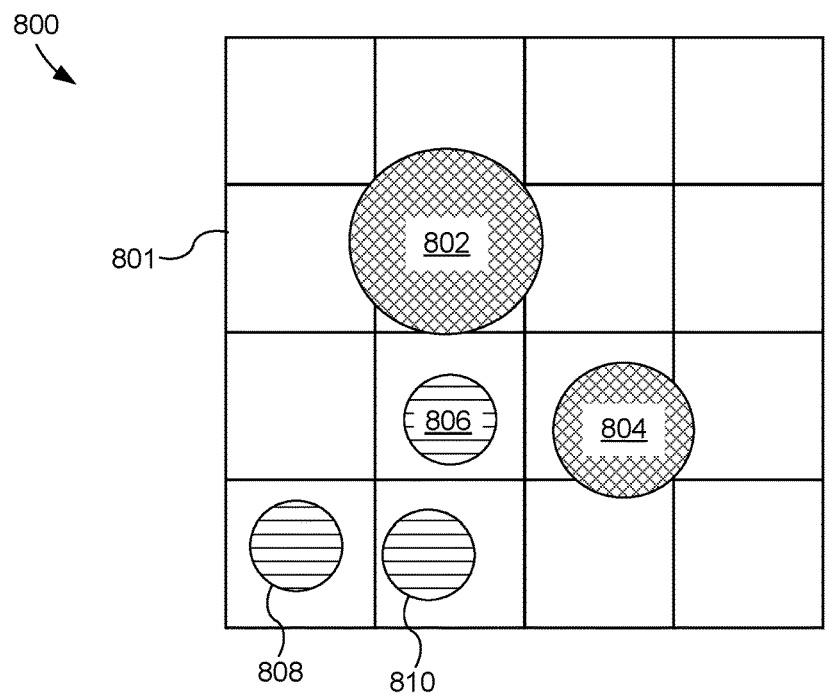
FIGS. 8A-8C illustrate a plurality of potential touch objects on a touch-sensitive display and results from a directional scanning operation, in accordance with some implementations.

FIG. 8A illustrates a top view of a touch-sensitive display 800, in accordance with some implementations. The touch-sensitive display includes a touch-sensitive array 801 with a plurality of sensor electrodes (e.g., each square represents a sensor electrode). A first candidate touch event 802 is shown contacting the touch-sensitive array 801 at a first location. The first candidate touch event 802 corresponds to a finger touch having a first size. The first candidate touch event 802 is substantially centered above a sensor electrode of the touch-sensitive array 801. In addition, a perimeter of the first candidate touch event 802 extends to several other neighboring sensor electrodes.

A second candidate touch event 804 is shown contacting the touch-sensitive array 801 at a second location. The second candidate touch event 804 corresponds to a finger touch having a second size, the second size being smaller than the first size. The second candidate touch event 804 is substantially centered above a sensor electrode. In addition, a perimeter of the second candidate touch event 804 extends to several other neighboring sensor electrodes.

A plurality of other touch events 806, 808, 810 are shown contacting the touch-sensitive array 801 at several additional locations. The plurality of other touch events corresponds to drops of water having substantially constant sizes. Each event of the plurality of other touch events is substantially centered above a respective sensor electrode.

Figure 8B:
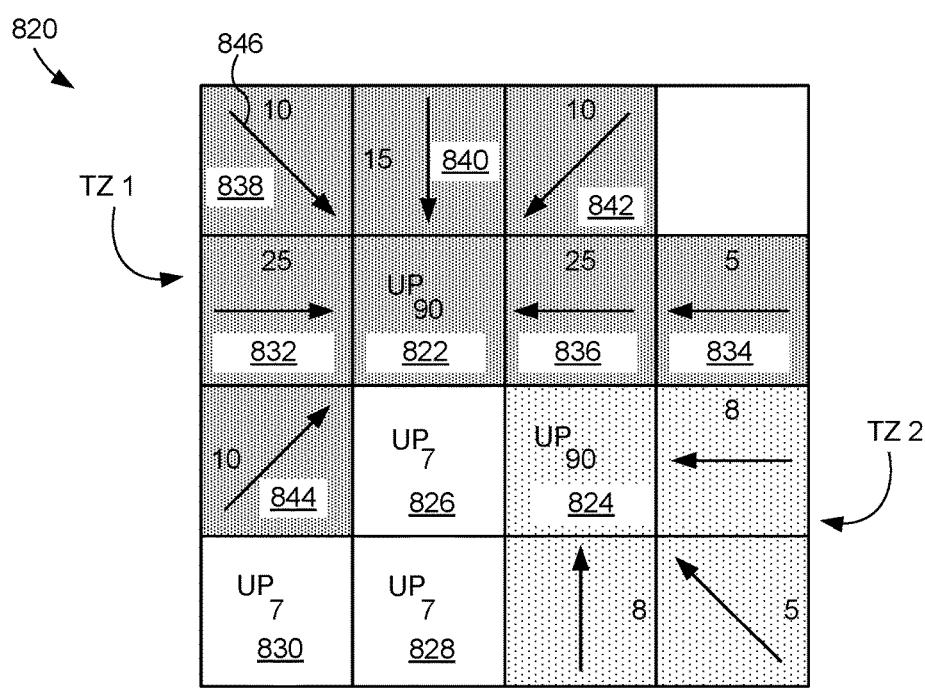

FIG. 8B illustrates a resulting prophetic diagram 820 of a directional scanning operation performed on the touch events described above in FIG. 8A, in accordance with some implementations. The resulting diagram 820 includes a signal direction (e.g., signal direction 846) determined for each sensor electrode in the plurality of sensor electrodes. The signal directions are determined during a directional scanning operation as discussed above with reference to FIGS. 6A-7B.

The resulting diagram 820 includes a first touch zone (TZ 1) and a second touch zone (TZ 2). A "touch zone" is a collection of sensor electrodes related to a peak electrode response, which may correspond to a valid touch object (e.g., a finger). A relationship between sensor electrodes is determined using signal directions. The signal direction for each sensor electrode in the touch zone indicates a relative location of a sensor electrode in the touch zone most responsible for creation of the signal direction. For example, the first touch zone includes a set of sensor electrodes 832-844 having signal directions pointing towards a peak electrode response at sensor electrode 822, and the second touch zone includes a different set of sensor electrodes (i.e., a different subset of the plurality of sensor electrodes) having signal directions pointing towards a different peak electrode response (e.g., sensor electrode 824). The sensor electrodes 822 and 824 are most responsible for creation of the signal directions in their respective touch zones.

A peak electrode response corresponds to a location of a candidate touch event. For example, the sensor electrode 822 has an electrode response 90, which is greater than other electrode responses in the first touch zone. Accordingly, the sensor electrode 822 is designated as a candidate touch event for the first touch zone. In addition, the sensor electrode 824 has an electrode response 90, which is greater than other electrode responses in the second touch zone. Accordingly, the sensor electrode 824 is designated as a candidate touch event for the second touch zone. As noted above, for ease of discussion, the touch events 802, 804 are centered above respective sensor electrodes, which simplifies identification of a candidate touch event. Directional scanning, however, can be used to identify candidate touch events located between two sensor electrodes or four sensor electrodes (e.g., situation illustrated in FIG. 10A). These advantages are discussed in more detail below.

The resulting diagram 820 also includes sensor electrodes 826, 830, and 832, which are not related to any neighboring sensor electrodes. In other words, the sensor electrodes 826, 830, and 832 are not part of a touch zone. Drops of water generally have a uniform size, which is less than the size of a sensor electrode. Accordingly, a drop of water typically does not affect neighboring sensor electrodes, and therefore, a drop of water does not create a touch zone. Note, however, that water may form a puddle, which may affect neighboring sensor electrodes. However, the nature/design of a touch screen, such as a smart watch, limits the ability of water to puddle. Instead, a puddle of water will typically break apart into several drops, and the result shown in FIG. 8B is once again obtained (i.e., three drops of water are form on the touch-sensitive array).

Figure 8C:
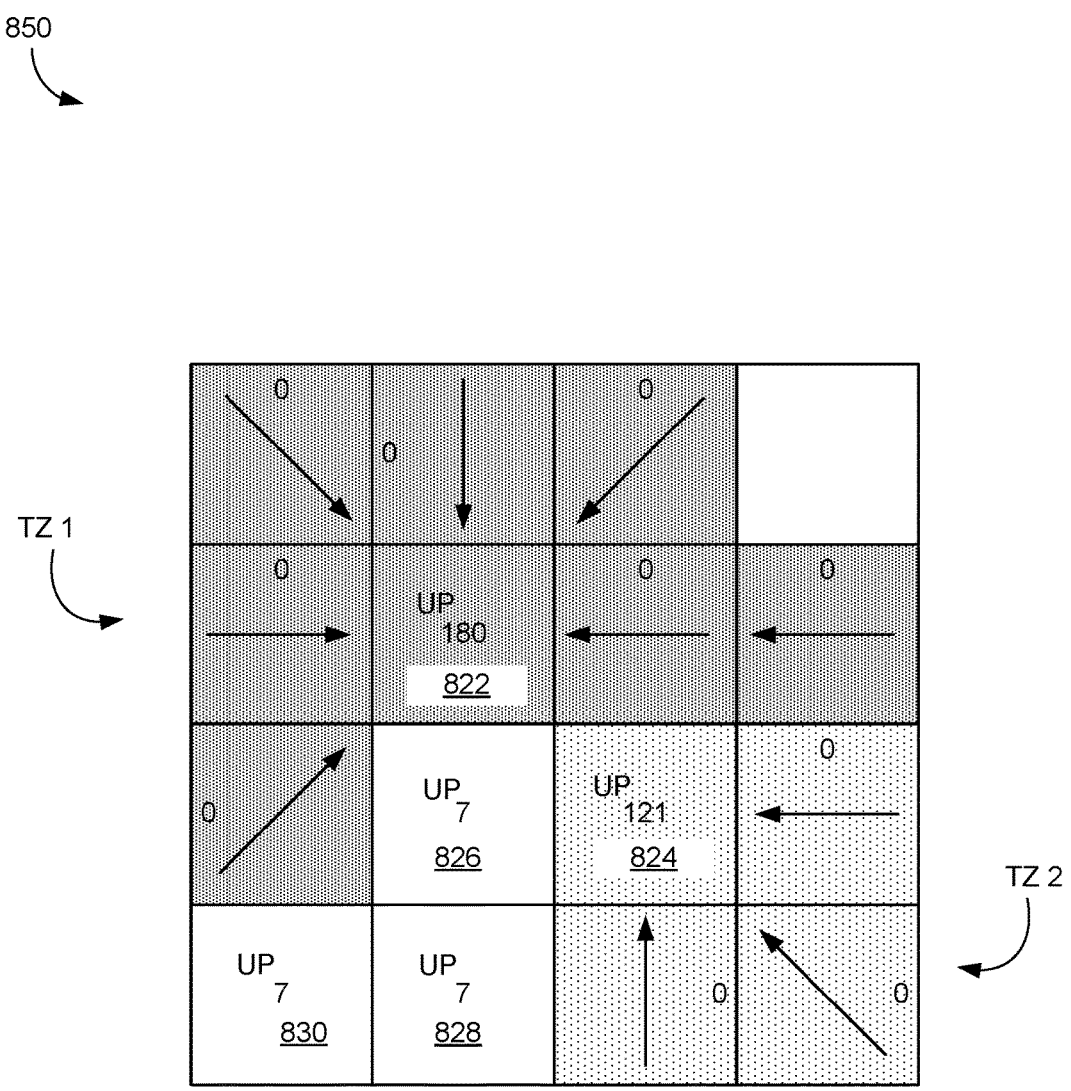

In some implementations, the processing device further processes the signal directions during a contribution operation. During the contribution operation, any sensor electrode with a "non-up" signal direction contributes its signal to a sensor electrode indicated by its signal direction. For example, sensor electrode 832 has a signal direction of "east" (i.e., to the right) pointing towards sensor electrode 822. Accordingly, an electrode response for the sensor electrode 832 is contributed to the electrode response of sensor electrode 822. This process is repeated for the touch-sensitive array, and resulting prophetic diagram 850 in FIG. 8C is produced.

As shown in the prophetic diagram 850, as a result of processing each of the signal directions, sensor electrode 822 has a contributed electrode response of 180 while sensor electrode 824 has a contributed electrode response of 121. This process increases a disparity between two candidate peaks (i.e., peaks having a larger number of contributory electrodes tend to be favored). This process also increases a disparity between a candidate peak and touch events caused by water. For example, sensor electrode 822 has an electrode response of 180 while sensor electrodes 826, 828, and 830 still have electrode responses of 7.

It should be noted that the contribution operation from sensor electrode to sensor electrode is not limited to peak electrode responses. For example, referring back to FIG. 8B, sensor electrode 834 has a signal direction of "west" pointing towards sensor electrode 836 and an electrode response of 5. Accordingly, the electrode response for the sensor electrode 834 is contributed to the electrode response of sensor electrode 836. In doing so, an electrode response for sensor electrode 836 is updated from 25 to 30, and as a result, the sensor electrode 836 contributes an electrode response of 30 to sensor electrode 822.

Figure 9:
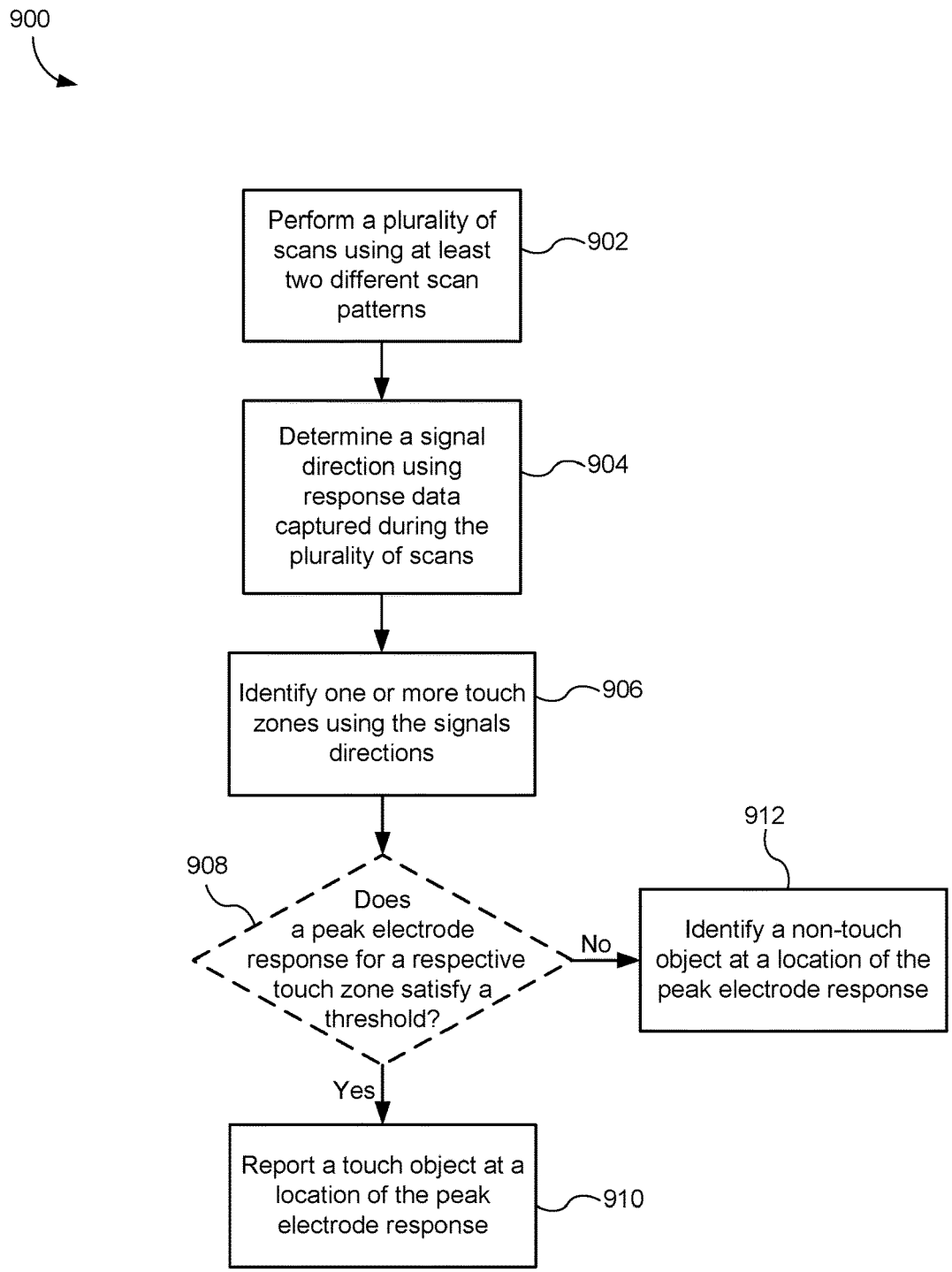
FIG. 9 provides a conceptual flowchart of a method of directional scanning for improved water performance on touch-sensitive displays, in accordance with some implementations.

FIG. 9 provides a conceptual flowchart of directional scanning for improved water performance on touch-sensitive displays, in accordance with some implementations. In some implementations, a method 900 is performed by a touch-sensitive device (e.g., processing device 120, FIG. 1) or one or more components of the processing device (e.g., touch controller 124 or management module 121-1, FIG. 1). In some implementations, the method 900 is governed by instructions that are stored in a non-transitory computer-readable storage medium, which are executed by one or more processors of the touch-sensitive device, such as the one or more processing units (CPUs) 122-1 of management module 121-1 (FIG. 1). In some implementations, some of the operations (or alternatively, steps) of method 900 are performed at a host system (e.g., computer system 110) that is operatively coupled with the touch-sensitive device 120 and other operations of method 900 are performed at the touch-sensitive device 120.

For ease of explanation, the method 900 is performed by the touch-sensitive device 120. With reference to FIG. 3, in some implementations, the operations of method 900 are performed, at least in part, by a scan module (e.g., scan module 312, FIG. 3), a presence module (e.g., presence module 314, FIG. 3), a signal direction module (e.g., signal direction module 316, FIG. 3), and an analyzing module (e.g., analyzing module 318, FIG. 3), or a program that embodies one or more functions of these modules.

In performing the method 900, the touch-sensitive device performs (902) a plurality of scans of the touch-sensitive array (e.g., touch-sensitive array 202, FIG. 2) using at least two different scan patterns. The plurality of scans captures response data for at least a subset of the plurality of sensor electrodes. In some implementations, the touch-sensitive device uses self-capacitance measurements to capture the response data. Alternatively or in addition, in some implementations, the touch-sensitive device uses mutual-capacitance measurements to capture the response data. In some implementations, performing the plurality of scans includes scanning the touch-sensitive array at a constant rate (e.g., scanning at 100 scans per second, or some greater (or lesser) rate). In some implementations, the plurality of scans captures response data for each of the plurality of sensor electrodes.

Each of the at least two different scan patterns includes a unique scan pattern. The unique scan patterns limit measurements (e.g., self-capacitance and/or mutual capacitance measurements) to specific sensor electrodes in the touch-sensitive array (e.g., limited to points of interest). In this way, the touch-sensitive device can isolate effects of a touch object to specific sensor electrodes, and even to a specific edge of a sensor electrode. For example, referring to FIG. 6A, the first scan pattern is configured such that measurements are limited to point of interest 608 (i.e., limited to an east edge of sensor electrode 606-C). This is accomplished by adjusting scan types used in the first scan pattern (e.g., modifying placement of normal TX square waves and inverted TX square waves within a given scan pattern). The second scan pattern is configured such that measurements are limited to point of interest 610 (i.e., limited to a west edge of sensor electrode 606-C). This is accomplished by adjusting scan types used in the second scan pattern. As shown, a pattern of the first and second scan types in the first scan pattern differs from a pattern of the first and second scan types in the second scan pattern.

In some implementations, the at least two different scan patterns include a first scan pattern in a first direction and a second scan pattern in a second direction. In some implementations, the first and second directions are opposite directions. For example, referring to FIG. 6A, the first scan pattern scans from right to left (e.g., an east scan pattern) and the second scan pattern scans from left to right (e.g., a west scan pattern). In some implementations, the first and second directions are the same direction. For example, the first and second scan patterns may both scan from right to left (or left to right, top to bottom, or bottom to top).

In some implementations, the at least two different scan patterns both scan along a directional axis. In some implementations, the directional axis is an east-west directional axis (e.g., the first and second scan patterns both scan along the east-west directional axis, FIG. 6A). In some implementations, the directional axis is a north-south directional axis. In some implementations, the directional axis is some other diagonal axis.

In some implementations, the at least two different scan patterns scan along different directional axes. For example, a first scan pattern of the at least two different scan patterns may scan along the east-west directional axis while a second scan pattern of the at least two different scan patterns may scan along a north-south directional axis (or vice versa).

In some implementations, the touch-sensitive device performs a plurality of scans of the touch-sensitive array using at least four different scan patterns. In some implementations, the at least four different scan patterns include a first scan pattern in a first direction, a second scan pattern in a second direction, a third scan pattern in a third direction, and a fourth scan pattern in a fourth direction. The first direction may be the same or opposite of the second direction, as discussed above. Similarly, the third direction may be the same or opposite of the fourth direction. In some implementations, the first and second scan patterns scan along a first directional axis (e.g., the east-west axis) and the third and fourth scan patterns scan along a second directional axis (e.g., north-south axis), or vice versa. In some implementations, a first scan uses the first scan pattern, a second scan uses the second scan pattern, and so on. Alternatively, in some implementations, some other order is used (e.g., a first scan uses the third scan pattern, a second scan uses the first scan pattern, and so on).

The touch-sensitive device determines (904) a signal direction for each sensor electrode in the subset using the response data. The signal direction for each sensor electrode indicates a relative location of a sensor electrode in the subset most responsible for creation of the signal direction. For example, referring to FIG. 8A, a touch object 802 (e.g., a user's finger) is centered above sensor electrode 822. As shown in FIG. 8B, sensor electrode 822 has an electrode response, which is larger than other sensor electrodes proximate to sensor electrode 822. For example, sensor electrode 838, which is in the vicinity of sensor electrode 822, has a signal direction 846 that points towards sensor electrode 822. The signal direction 846 indicates a relative location of sensor electrode 822 because sensor electrode 822 is most responsible for creation of the signal direction 846 (as described above with reference to FIGS. 6A-6B). A signal direction for each sensor electrode in the subset may be: (i) "up," (ii) one of the cardinal directions, or (iii) one of the primary inter-cardinal directions.

In some implementations, to determine the signal direction for each sensor electrode in the subset, the touch-sensitive device determines a first axis signal direction (e.g., a signal direction along the east-west axis or the north-south axis) for each sensor electrode in the subset. To accomplish this, the touch-sensitive device identifies a directional component of an electrode response at a respective sensor electrode during each of the at least two different scan patterns. For example, referring to FIG. 6A, the first scan using the first scan pattern identifies an east component of an electrode response caused by touch object 604 at the sensor electrode 606-C and the second scan using the second scan pattern identifies a west component of the electrode response caused by touch object 604 at the sensor electrode 606-C.

In those implementations involving at least four different scan patterns, the touch-sensitive device determines a second axis signal direction for each sensor electrode in the subset. To accomplish this, the touch-sensitive device identifies an additional directional component of the electrode response at the respective sensor electrode during a third scan using a third scan pattern (e.g., identifies a north component of the electrode response) and identifies an additional directional component of the electrode response at the respective sensor electrode during a fourth scan using a fourth scan pattern (e.g., identifies a south component of the electrode response) (or vice versa). The particular order of identifying the directional component can be changed, depending on the circumstances (e.g., north and south can be identified and then the east and west can be identified, or some other order).

After identifying the directional components of the electrode response at the respective sensor electrode, the touch-sensitive device combines the directional components to determine the first axis signal direction and the second axis signal direction. The touch-sensitive device may subtract (or perform some other mathematic operation) one directional component from another directional component to combine the directional components. For example, referring to FIG. 6A, the first scan using the first scan pattern identifies an east component and the second scan using the second scan pattern identifies a west component at the sensor electrode 606-C. The touch-sensitive device may subtract the east component from the west component (or vice versa) to determine the first axis signal direction (e.g., the signal direction along the east-west axis). In those implementations involving at least four different scan patterns, the touch-sensitive device may subtract the south component from the north component (or vice versa) to determine the second axis signal direction (e.g., the signal direction along the north-south axis).

Furthermore, in some implementations, the touch-sensitive device determines whether the first axis signal direction for each sensor electrode in the subset satisfies a first direction threshold. To accomplish this, the touch-sensitive device compares the first axis signal direction (e.g., a combination of the east and west directional components or a combination of the north and south directional components) against one or more corresponding directional thresholds. In those implementations involving at least four different scan patterns, the touch-sensitive device also determines whether the second axis signal direction for each sensor electrode in the subset satisfies a second direction threshold. Directional thresholds are discussed in further detail above with reference to FIG. 7A.

In some implementations, in determining the signal direction for each sensor electrode in the subset, the touch-sensitive device combines the first axis signal direction with the second axis signal direction (e.g., combine the signal direction along the east-west axis with the signal direction along the north-south axis). The primary inter-cardinal directions are determined by combining first and second axes signal directions that both satisfy their respective corresponding thresholds (e.g., combine "west" outcome with "north" outcome to obtain "northwest" signal direction).

In some implementations, the touch-sensitive device identifies (906) one or more touch zones, each including a group of sensor electrodes with signal directions that point towards a peak electrode response included in the group. The peak electrode response indicates a location of a candidate touch object on the touch-sensitive array. As discussed above with reference to FIGS. 8A-8C, a "touch zone" is a collection of sensor electrodes related to a peak electrode response, which may correspond to a valid touch object (e.g., a finger). A relationship between sensor electrodes is determined using signal directions. For example, sensor electrodes 834-844 form a group of sensor electrodes because the sensor electrodes have signal directions (e.g., signal direction 846) that point towards a peak electrode response at sensor electrode 822, which is also included in the group (FIG. 8B). Accordingly, sensor electrodes 822 and 834-844 form a first touch zone.

Figure 10A:
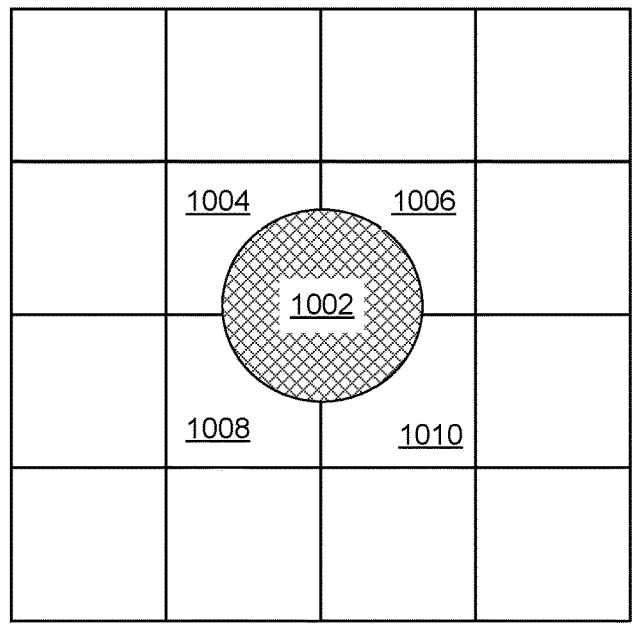
FIGS. 10A-10C illustrate a single touch object contacting multiple sensor electrodes of a touch-sensitive display and results from a directional scanning operation, in accordance with some implementations.

In some implementations, when identifying the one or more touch zones, the touch-sensitive device determines that multiple peak electrode responses are related to the same touch object. For example, as illustrated in FIG. 10A, a touch object 1002 is positioned between four sensor electrodes 1004, 1006, 1008, and 1010, and therefore, response data associated with the touch object 1002 is spread across the four sensor electrodes. This situation may also arise when a touch object, such as a stylus, is positioned between two sensor electrodes.

In some implementations, to determine that the multiple peak electrode responses are related to the same touch object, the touch-sensitive device: (i) identifies a first group of sensor electrodes having signal directions that point towards a first peak electrode response included in the first group and (ii) identifies a second group of sensor electrodes having signal directions that point towards a second peak electrode response included in the second group. After identifying the first and second groups, the touch-sensitive device analyzes signal directions for the sensor electrodes in the first and second groups, respectively. The touch-sensitive device determines that multiple peak electrode responses are related to the same touch object when, based on the analyses: (i) the first and second peak electrode responses are adjacent to one another and (ii) the signal directions for the first group of sensor electrodes mirror the signal directions for the second group of sensor electrodes. It should be noted that the electrode responses may differ (i.e., electrode responses do not necessarily have to mirror one another).

Figure 10B:
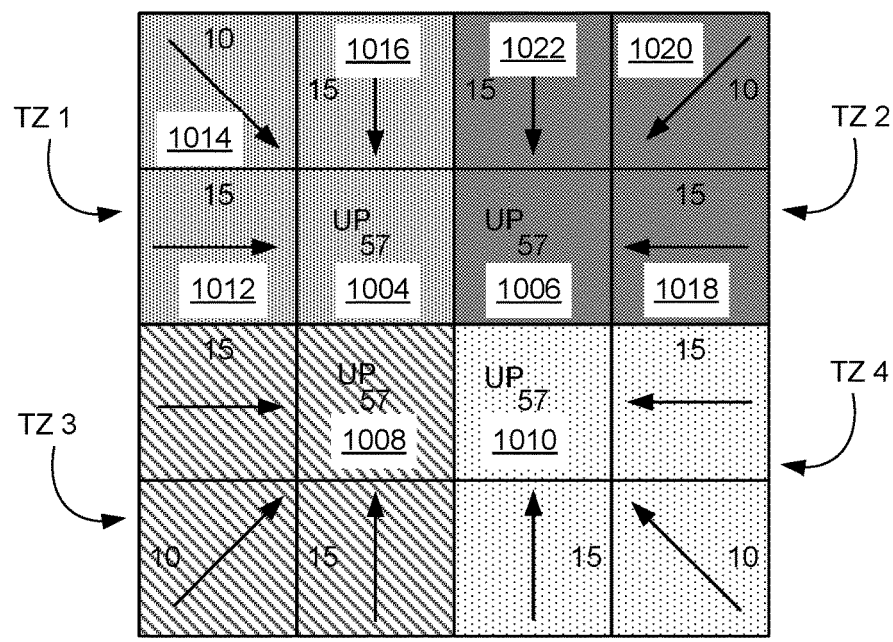

To illustrate, referring to FIG. 10B, sensor electrodes 1012-1016 form a first group of sensor electrodes with signal directions that point towards a peak electrode response at sensor electrode 1004 included in the first group. Furthermore, sensor electrodes 1018-1022 form a second group of sensor electrodes with signal directions that point towards a peak electrode response at sensor electrode 1006 included in the second group. In addition, sensor electrode 1004 is adjacent to sensor electrode 1006. Furthermore, signal directions for the first group (TZ 1) mirror the signal directions for the second group (TZ 2). As such, the touch-sensitive device would determine that sensor electrodes 1004 and 1006 are related to touch object 1002.

In some implementations, the touch-sensitive device extends the steps above to other sensor electrodes affected by the touch object. For example, the touch-sensitive device would determine that sensor electrodes 1004, 1006, 1008, and 1010 are related to touch object 1002 because (i) the four sensor electrodes are adjacent to one another and (ii) the signal directions illustrated in FIG. 8B mirror each other.

Alternatively or in addition, in some implementations, to determine that the multiple peak electrode responses are related to the same touch object, the touch-sensitive device identifies touch zones (as discussed above) and combines shapes of the touch zones. A combination that yields a regular shape (e.g., a square, or in some circumstances, a rectangle) is an indication that the multiple peak electrode responses are related to the same touch object. For example, touch zones TZ 1 and TZ 2 in FIG. 10B form a rectangle, which is an indication that the multiple peak electrode responses 1004 and 1006 are related to the touch object 1002. In some implementations, acceptable shapes are stored in memory (e.g., thresholds and shapes 328, FIG. 3) of the management module 121-1.

In some implementations, when identifying the one or more touch zones, the touch-sensitive device determines that one or more electrode responses in the subset are related to a non-touch object (e.g., water) by (i) identifying a first group of sensor electrodes having signal directions that point in a first direction and (ii) identifying a second group of sensor electrodes having signal directions that point in a second direction, the second direction being opposite to the first direction, and the first and second groups of sensor electrodes are adjacent to one another.

Figure 11:
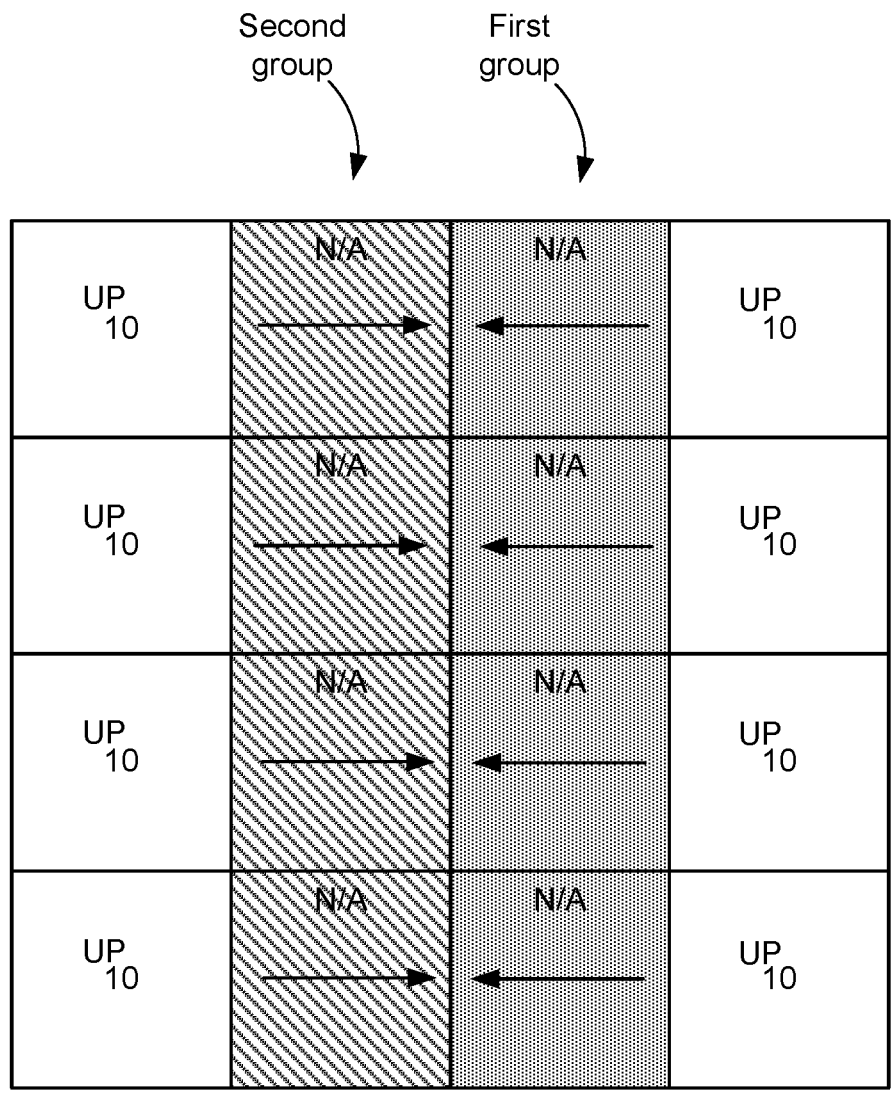
FIG. 11 illustrates a resulting prophetic diagram of a directional scanning operation involving a rivulet of water, in accordance with some implementations.

To illustrate, FIG. 11 depicts results from a direction scanning operation involving a rivulet of water (e.g., a long and skinny water phenomenon) running across the touch-sensitive display. In this particular example, the rivulet of water runs between sensor electrodes (e.g., runs between, or along, edges of sensor electrodes). Accordingly, signal directions in FIG. 11 point towards where the rivulet ran (or is running) and two groups of sensor electrodes are formed. As shown, signal directions in the first group point "west" (i.e., to the left) and signal directions in the second group point "east" (i.e., to the right). In addition, the first and second groups are adjacent to one another. Accordingly, the touch-sensitive device would determine (e.g., using a predefined algorithm) that electrode responses, if any, for the first and second groups are related to a non-touch object, i.e., a rivulet of water.

In some implementations, when identifying the one or more touch zones, the touch-sensitive device determines that multiple peak electrode responses are related to different touch objects. To accomplish this, in some implementations, the touch-sensitive device determines that signal directions for a first group of sensor electrodes do not mirror signal directions for a second group of sensor electrodes. Alternatively or in addition, in some implementations, the touch-sensitive device determines that multiple peak electrode responses are related to different touch objects by determining that a magnitude of a first peak electrode response differs from a magnitude of a second peak electrode response by a threshold amount (as discussed below, in some implementations, the threshold amount is based on a contributed electrode response).

Figure 13:
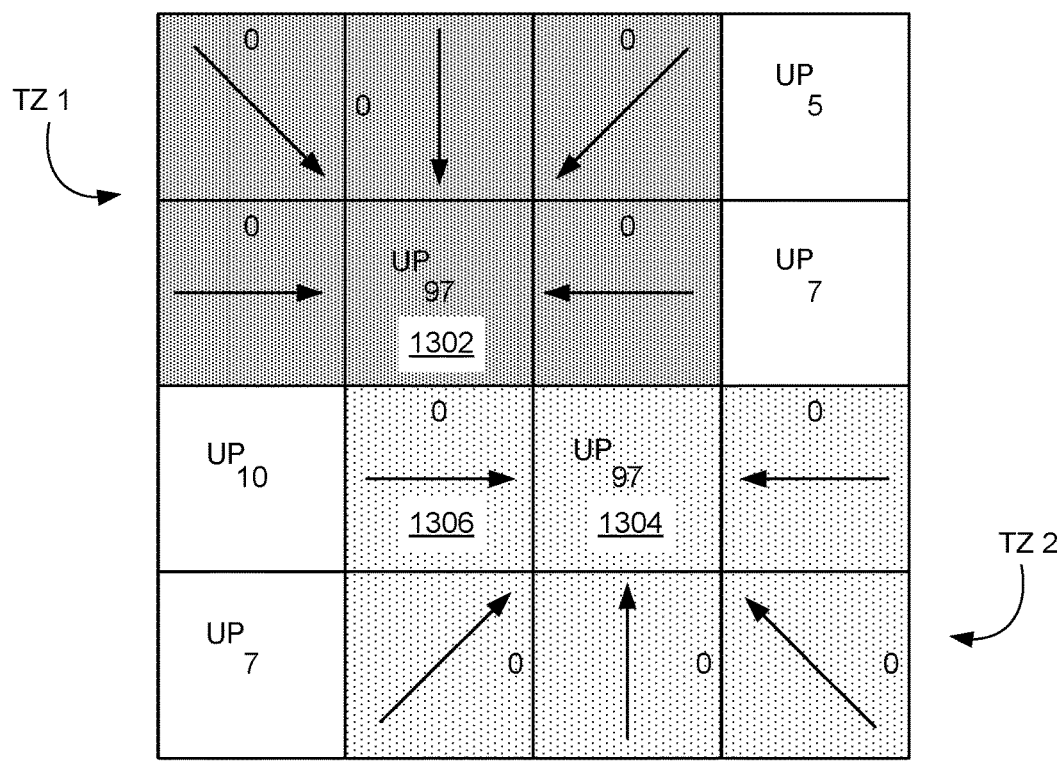
FIG. 13 illustrates a resulting prophetic diagram of a directional scanning operation involving two distinct touch objects, in accordance with some implementations.

Alternatively or in addition, in some implementations, the touch-sensitive device determines that multiple peak electrode responses are related to different touch objects by (i) identifying a first group of sensor electrodes having signal directions that point towards a first peak electrode response included in the first group and (ii) identifying a second group of sensor electrodes having signal directions that point towards a second peak electrode response included in the second group. If the first and second peaks are adjacent to and separated by at least one sensor electrode, then the touch-sensitive device may determine that the first and second peak electrode responses are related to different touch objects. FIG. 13 illustrates this situation. As shown, the touch-sensitive device identifies a first touch zone (TZ 1) and a second touch zone (TZ 2), each touch zone having a peak electrode response of equal magnitude (e.g., the peak electrode response 1302 for TZ 1 is 97 and the peak electrode response 1304 for TZ 2 is also 97). Sensor electrode 1306 is adjacent to both sensor electrodes 1302, 1304 and points towards sensor electrode 1304. Based on this, the first and second peaks would be deemed to related to different touch objects.

In some implementations, the touch-sensitive device determines (908), for each identified touch zone, whether a peak electrode response for a respective touch zone satisfies a threshold (e.g., a predefined response threshold, such as a touch threshold). In accordance with a determination that the peak electrode response for the respective touch zone satisfies the threshold (908-Yes), the touch-sensitive device reports (910) a touch object at the location associated with the peak electrode response.

In some implementations, the peak electrode response for the respective touch zone is determined using a cross-correlation calculation. The cross-correlation calculation involves selecting a predefined number (e.g., four, or some greater (or lesser) number) of neighboring electrodes in the touch zone (e.g., neighboring the peak electrode response), adding electrode responses for the selected neighboring electrodes together, and multiplying the added electrode responses by the peak electrode response.

In some implementations, in accordance with a determination that the peak electrode response for the respective touch zone does not satisfy the threshold (908-No), the touch-sensitive device identifies (912) a non-touch object at the location associated with the peak electrode response. In other words, the touch-sensitive device forgoes reporting a touch object at the location associated with the peak electrode response.

In some implementations, prior to determining whether the peak electrode response for the respective touch zone satisfies the threshold (908), the touch-sensitive device contributes, for each identified touch zone, electrode responses from the group of sensor electrodes in the touch zone to the peak electrode response for the touch zone. After performing the contribution, the touch-sensitive device compares the contributed peak electrode response for the touch zone with the threshold. In doing this, the touch-sensitive device increases a disparity between candidate touch events associated with legitimate touch objects and candidate touch events associated with water. For example, a finger, due to its size and shape, generally creates a touch zone that spans multiple sensor electrodes. As such, a contribution operation will increase a peak electrode response caused by the finger. Conversely, a drop of water generally does not create a touch zone (or creates a small touch zone that includes few sensor electrodes). As such, a contribution operation will either: (i) not increase a peak electrode response caused by the drop of water or (ii) the increase will be minimal relative to the increase of the peak electrode response caused by the finger.

In addition, the contribution operation may also increase a disparity between two finger touches. For example, referring to FIG. 8B, before the contribution operation, the peak electrode responses at sensor electrodes 822, 824 were equal. After the contribution operation, now referring to FIG. 8C, the contributed peak electrode response at sensor electrode 822 for the first touch zone is substantially greater than the contributed peak electrode response at sensor electrode 824 for the second touch zone. Thus, the contribution operation also increases the disparity between finger touches.

Figure 10C:
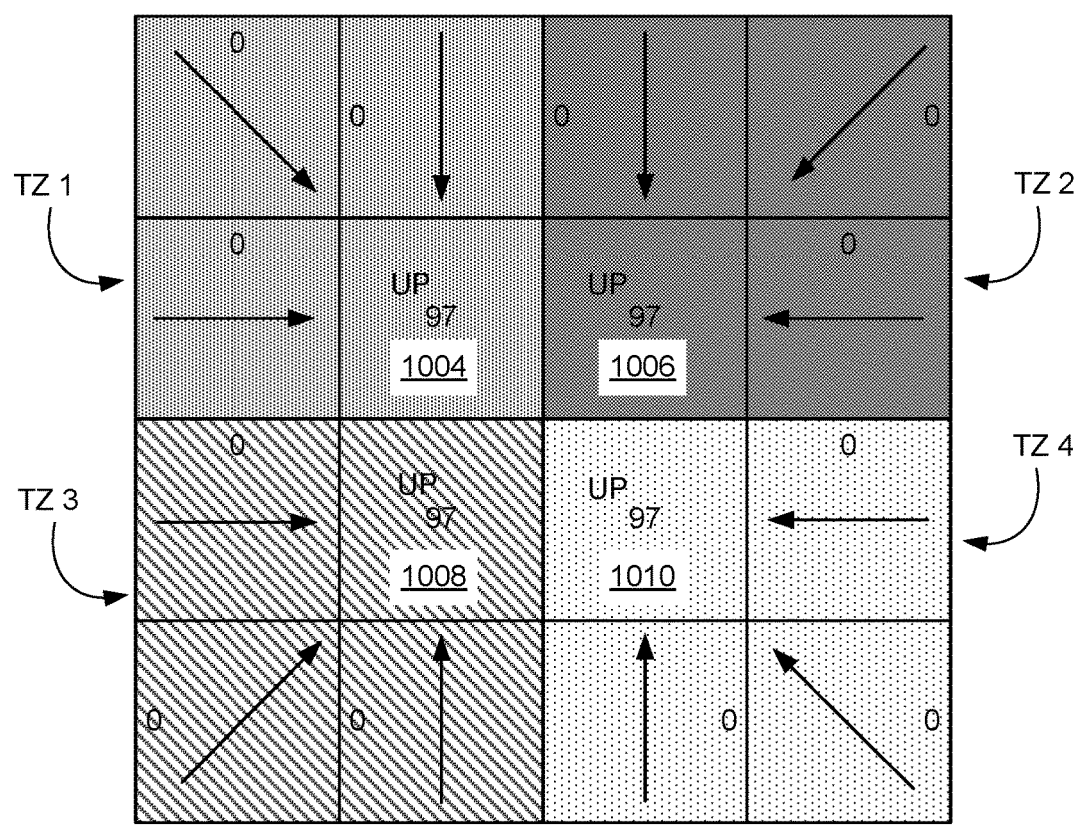

In those implementations where multiple peak electrode responses are related to the same touch object, the contribution operation allows the multiple peak electrode responses to satisfy the threshold. For example, referring to FIG. 10B, without performing the contribution operation, an overall electrode response caused by the touch object 1002 is spread across four sensor electrodes, and as a result, for the sake of discussion, none of the individual electrode responses satisfy the threshold. Now referring to FIG. 10C, which illustrates a prophetic result of a contribution operation, the four sensor electrodes 1004, 1006, 1008, 1010 have electrodes responses, for the sake of discussion, that satisfy the threshold.

In some implementations, when contributing electrode responses to the peak electrode response for the touch zone, the touch-sensitive device selects a predefined number (e.g., four, or some greater (or lesser) number) of neighboring electrodes in the touch zone (e.g., neighboring the peak electrode response), and limits the contribution of electrode responses to those neighboring electrodes. This process further enhances the cross-correlation calculation discussed above because only those sensor electrodes that are associated with the peak electrode response (e.g., as indicated by their respective signal directions) are included in the cross-correlation calculation.

In some implementations, prior to determining whether the peak electrode response for the respective touch zone satisfies the threshold (908), the touch-sensitive device further determines, for each identified touch zone, a shape of the touch zone. In some circumstances, a shape of a touch, or lack of a shape, indicates a nature of the candidate touch event. For example, fingers generally create regular shapes, such as squares or rectangles whereas water events, form irregular shapes, or no shape at all (e.g., a single sensor electrode is activated). In light of this, a shape criterion may be satisfied when the shape of the touch zone is regular, such as a square or a rectangle. In some implementations, the touch-sensitive device stores in memory shapes (e.g., shapes 328, FIG. 3) that are associated with water events, including shapes for a drop, puddle, spray, rivulet, trail, or condensation of water. In some implementations, the touch-sensitive device stores in memory shapes (e.g., shapes 328, FIG. 3) that are associated with finger touches.

Accordingly, after determining the shape for the touch zone, the touch-sensitive device determines whether the shape for the touch zone satisfies a shape criterion. In some implementations, reporting the touch object is further performed in accordance with a determination that the shape of the touch zone satisfies the shape criterion (i.e., the shape is regular and/or is not one of the water event shapes).

Figure 12:
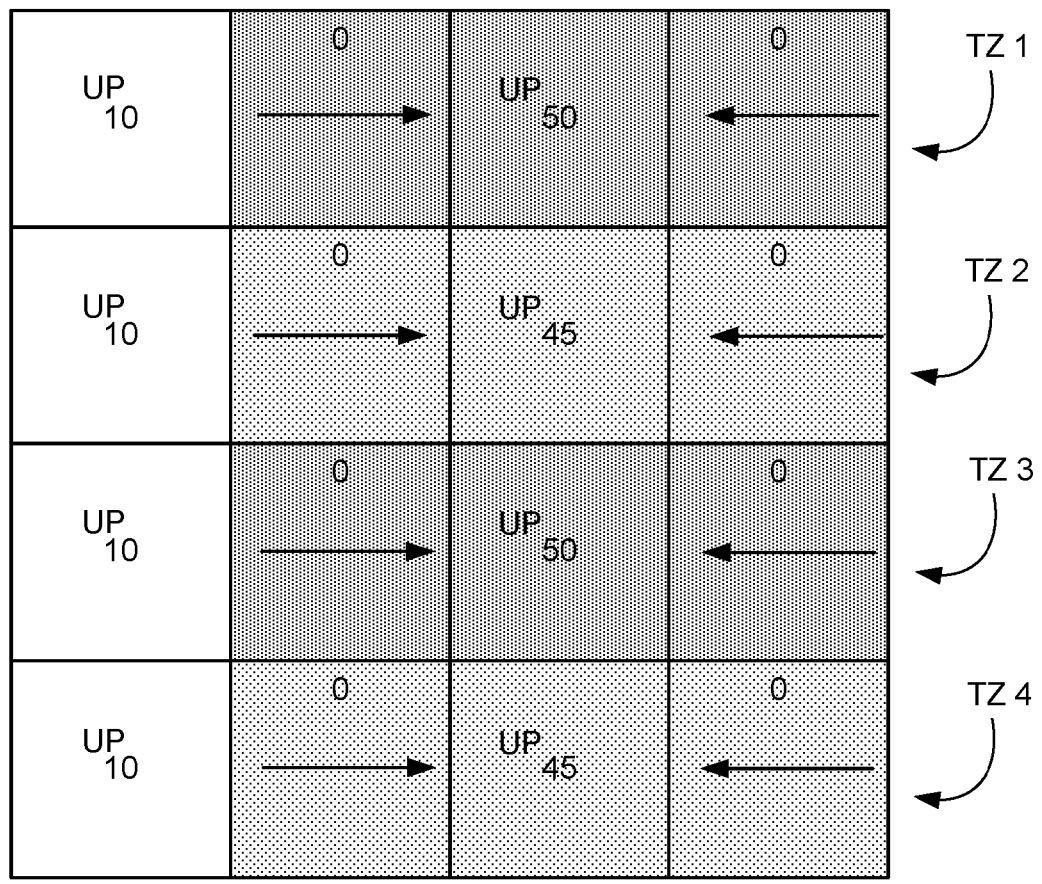
FIG. 12 illustrates a resulting prophetic diagram of a directional scanning operation involving a trail of water, in accordance with some implementations.

In some implementations, prior to reporting the touch object at the location associated with the peak electrode response (910), the touch-sensitive device performs a plurality of additional scans of the touch-sensitive array using the at least two different scan patterns in response to identifying the one or more touch zones. The plurality of additional scans can be used to identify changes in the one or more touch zones indicative of water based touch events. For example, during the initial plurality of scans of the touch-sensitive array, the touch-sensitive device may identify a touch zone caused by a trail of water (or a puddle). The touch zone may appear, at least initially, to be one rectangular touch zone (e.g., a touch zone spanning several sensor electrodes). However, the trail of water (or the puddle) will quickly break apart into several smaller touch zones. Accordingly, performing the plurality of additional scans at some predefined time after performing the initial plurality of scans can identify these changes in the touch zone. FIG. 12 illustrates a result of a trail of water (or a puddle) breaking into several smaller touch zones. As shown, the touch-sensitive device identified four distinct touch zones, during the plurality of additional scans, each having a peak electrode response with substantially similar magnitudes (TZ 1, TZ 2, TZ 3, and TZ 4).

In some circumstances or situations, one of the identified touch zones is positioned along an edge of the touch-sensitive array (e.g., half of a user's finger is contacting the touch-sensitive array). In these circumstances or situations, complete directional data cannot be obtained for sensor electrodes adjacent to the edge of the touch-sensitive array. To determine a position of a touch object using a directional scanning operation, the touch-sensitive device determines a number of sensor electrodes in the touch zone that are adjacent to the edge of the touch-sensitive array using signal directions. In addition, the touch-sensitive device reports a size of the touch object based at least in part on (i) a value of the peak electrode response for the touch zone (e.g., a magnitude of the electrode response) and (ii) the number of sensor electrodes in the touch zone that are adjacent to the edge of the touch-sensitive array.

Figure 14A:
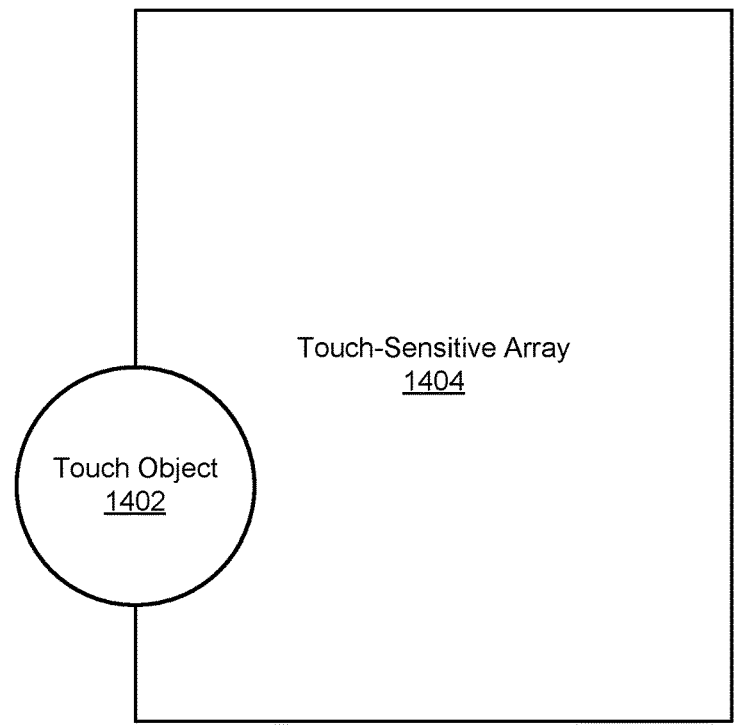
FIGS. 14A-14B illustrate a touch object positioned along an edge of the touch-sensitive array and results from a directional scanning operation, in accordance with some implementations.
Figure 14B:
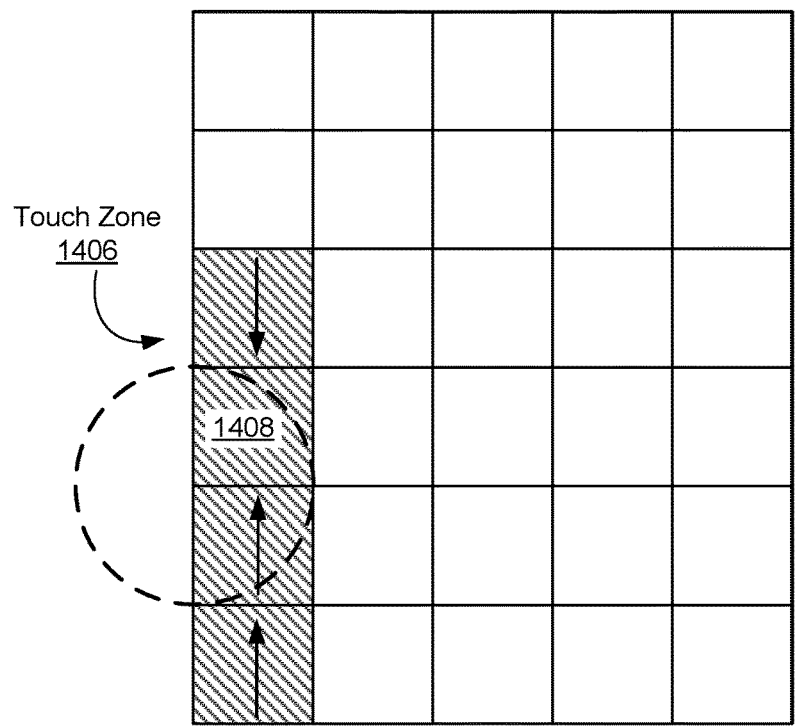

For example, referring to FIGS. 14A-14B, touch object 1402 is positioned along an edge of the touch-sensitive array 1404. Touch zone 1406 results from the touch object 1402 contacting the touch-sensitive array 1404 and includes four sensor electrodes along a vertical axis. Within the touch zone 1406, a peak electrode response 1408 for the touch zone 1406 has an electrode response of "X." Using these two pieces of information, the touch-sensitive device can estimate the size of the touch object 1402. In this example, as shown in FIG. 14B, the touch zone 1406 includes four sensor electrodes along the vertical axis and therefore the size of the touch object 1402 is estimated according to the four sensor electrodes along the vertical axis.

Aside from water detection, the directional scanning technique described herein may also be used to test individual sensor electrodes in the touch-sensitive array. To accomplish this, in some embodiments, a touch object having a predetermined size can be placed at a location on the touch-sensitive array. Because the touch object has a predetermined size, certain sensor electrodes are expected to respond in a planned manner. For example, a sensor electrode southwest of the touch object (e.g., sensor electrode 844, FIG. 8B) should have a signal direction that points towards a sensor electrode centered below the touch object (e.g., sensor electrode 822, FIG. 8B). However, if the sensor electrode southwest of the touch object is not functioning properly, it may not respond in the planned manner (e.g., the signal direction may not point towards the sensor electrode centered below the touch object and instead may have an "up" outcome, or some other outcome). In such a case, the directional scanning technique described herein can be implemented to identify the sensor electrode that is not functioning properly. If an issue is discovered, the issue may be corrected (e.g., touch-sensitive device is reset, the sensor electrode that is not functioning properly is not considered in future touch responses, or the processing device assigns a response to the sensor electrode that is not functioning properly, e.g., based on signal directions of neighboring sensor electrodes).

In some embodiments, the touch-sensitive array is tested prior to assembling the touch-sensitive device. Accordingly, if an issue is discovered, the touch-sensitive array may be discarded prior to assembling the touch-sensitive device (e.g., a different touch-sensitive array may be used to form the touch-sensitive device). In this way, a defective device does not enter the stream of commerce.

In some embodiments, a touch object need not be used to test individual sensor electrodes in the touch-sensitive array. Moreover, in some embodiments, the size of the touch object need not be predetermined.

It will be understood that, although the terms "first," "second," etc. may be used herein to describe various electrodes, these electrodes should not be limited by these terms. These terms are only used to distinguish one electrode from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method, comprising:
  at a touch-sensitive device having one or more processors and a touch-sensitive array that includes a plurality of sensor electrodes:
    performing a plurality of scans of the touch-sensitive array using at least two different scan patterns, wherein the plurality of scans captures response data for at least a subset of the plurality of sensor electrodes;
    determining a signal direction for each sensor electrode in the subset using the response data, wherein the signal direction for each sensor electrode indicates a relative location of a sensor electrode in the subset most responsible for creation of the signal direction;
    identifying one or more touch zones, each comprising a group of sensor electrodes with signal directions that point towards a peak electrode response included in the group, wherein the peak electrode response indicates a location of a candidate touch object on the touch-sensitive array; and
    for each identified touch zone:
      contributing electrode responses from the group of sensor electrodes in the touch zone to the peak electrode response for the touch zone, and
      reporting a touch object at the location associated with the peak electrode response in accordance with a determination that the contributed peak electrode response for the touch zone satisfies a predefined response threshold.

2. The method of claim 1, further comprising, at the touch-sensitive device, for each identified touch zone, identifying a non-touch object at the location associated with the peak electrode response in accordance with a determination that the contributed peak electrode response for the touch zone does not satisfy the predefined response threshold.

3. The method of claim 1, further comprising, at the touch-sensitive device, for each identified touch zone, determining a shape of the touch zone,
  wherein reporting the touch object is further performed in accordance with a determination that the shape of the touch zone satisfies a shape criterion.

4. The method of claim 3, wherein the shape of the touch zone is associated with a drop, puddle, spray, rivulet, trail, or condensation of water.

5. The method of claim 1, wherein determining the signal direction for each sensor electrode in the subset comprises:
  determining a first axis signal direction for each sensor electrode in the subset;
  determining a second axis signal direction for each sensor electrode in the subset;
  determining whether the first axis signal direction for each sensor electrode in the subset satisfies a first direction threshold; and
  determining whether the second axis signal direction for each sensor electrode in the subset satisfies a second direction threshold.

6. The method of claim 5, wherein determining the signal direction for each sensor electrode in the subset further comprises:
  combining the first axis signal direction with the second axis signal direction.

7. The method of claim 1, wherein the signal direction is a cardinal direction or a primary inter-cardinal direction.

8. The method of claim 1, further comprising, at the touch-sensitive device, storing the response data captured from the plurality of scans.

9. The method of claim 1, wherein identifying the one or more touch zones comprises determining that multiple peak electrode responses are related to the same touch object by:
  identifying a first group of sensor electrodes having signal directions that point towards a first peak electrode response included in the first group; and identifying a second group of sensor electrodes having signal directions that point towards a second peak electrode response included in the second group, wherein:

the first and second peak electrode responses are adjacent to one another, and the signal directions for the first group of sensor electrodes mirror the signal directions for the second group of sensor electrodes.

10. The method of claim 1, wherein identifying the one or more touch zones comprises determining that one or more electrode responses in the subset are related to a non-touch object by:

identifying a first group of sensor electrodes having signal directions that point in a first direction; and identifying a second group of sensor electrodes having signal directions that point in a second direction, wherein:

the second direction is opposite to the first direction, and the first and second groups of sensor electrodes are adjacent to one another.

11. The method of claim 1, wherein identifying the one or more touch zones comprises determining that multiple peak electrode responses are related to different touch objects by:

identifying a first group of sensor electrodes having signal directions that point towards a first peak electrode response included in the first group; and identifying a second group of sensor electrodes having signal directions that point towards a second peak electrode response included in the second group, wherein the first and second peaks are adjacent to and separated by at least one sensor electrode.

12. The method of claim 1, further comprising, at the touch-sensitive device, performing a plurality of additional scans of the touch-sensitive array using the at least two different scan patterns in response to identifying the one or more touch zones, wherein reporting the touch object for each identified touch zone is further performed in accordance with a determination that the same touch zone is identified by the plurality of additional scans.

13. The method of claim 1, wherein:

one of the identified touch zones is positioned along an edge of the touch-sensitive array and the method further comprises, at the touch-sensitive device, for the touch zone positioned along the edge of the touch-sensitive array:

determining a number of sensor electrodes in the touch zone that are adjacent to the edge of the touch-sensitive array; and reporting a size of the touch object based at least in part on: (i) a value of the peak electrode response for the touch zone, and (ii) the number of sensor electrodes in the touch zone that are adjacent to the edge of the touch-sensitive array.

14. A touch-sensitive device, comprising:

a touch-sensitive array that includes a plurality of sensor electrodes;

one or more processors; and memory storing one or more programs, the one or more programs including instructions, which when executed by the one or more processors cause the touch-sensitive device to:

perform a plurality of scans of the touch-sensitive array using at least two different scan patterns, wherein the plurality of scans captures response data for at least a subset of the plurality of sensor electrodes;

determine a signal direction for each sensor electrode in the subset using the response data, wherein the signal direction for each sensor electrode indicates a relative location of a sensor electrode in the subset most responsible for creation of the signal direction;

identify one or more touch zones, each comprising a group of sensor electrodes with signal directions that point towards a peak electrode response included in the group, wherein the peak electrode response indicates a location of a candidate touch object on the touch-sensitive array; and for each identified touch zone:

contribute electrode responses from the group of sensor electrodes in the touch zone to the peak electrode response for the touch zone, and report a touch object at the location associated with the peak electrode response in accordance with a determination that the contributed peak electrode response for the touch zone satisfies a predefined response threshold.

15. The touch-sensitive device of claim 14, wherein the one or more programs further include instructions, which when executed by the one or more processors cause the touch-sensitive device to:

for each identified touch zone, identify a non-touch object at the location associated with the peak electrode response in accordance with a determination that the contributed peak electrode response for the touch zone does not satisfy the predefined response threshold.

16. The touch-sensitive device of claim 14, wherein the one or more programs further include instructions, which when executed by the one or more processors cause the touch-sensitive device to:

for each identified touch zone, determine a shape of the touch zone, wherein reporting the touch object is further performed in accordance with a determination that the shape of the touch zone satisfies a shape criterion.

17. The touch-sensitive device of claim 16, wherein the shape of the touch zone is associated with a drop, puddle, spray, rivulet, trail, or condensation of water.

18. A non-transitory computer-readable storage medium, storing one or more programs configured for execution by one or more processors of a touch-sensitive device having a touch-sensitive array that includes a plurality of sensor electrodes, the one or more programs including instructions for:

performing a plurality of scans of the touch-sensitive array using at least two different scan patterns, wherein the plurality of scans captures response data for at least a subset of the plurality of sensor electrodes;

determining a signal direction for each sensor electrode in the subset using the response data, wherein the signal direction for each sensor electrode indicates a relative location of a sensor electrode in the subset most responsible for creation of the signal direction;

identifying one or more touch zones, each comprising a group of sensor electrodes with signal directions that point towards a peak electrode response included in the group, wherein the peak electrode response indicates a location of a candidate touch object on the touch-sensitive array; and for each identified touch zone:

contributing electrode responses from the group of sensor electrodes in the touch zone to the peak electrode response for the touch zone, and reporting a touch object at the location associated with the peak electrode response in accordance with a determination that the contributed peak electrode response for the touch zone satisfies a predefined response threshold.

19. The non-transitory computer-readable storage medium of claim 18, wherein the one or more programs further include instructions for:

for each identified touch zone, identifying a non-touch object at the location associated with the peak electrode response in accordance with a determination that the contributed peak electrode response for the touch zone does not satisfy the predefined response threshold.

20. The non-transitory computer-readable storage medium of claim 18, wherein the one or more programs further include instructions for:

for each identified touch zone, determining a shape of the touch zone, wherein reporting the touch object is further performed in accordance with a determination that the shape of the touch zone satisfies a shape criterion.

* * * * *